US012641590B2

(12) United States Patent
Liu et al.

(10) Patent No.: US 12,641,590 B2
(45) Date of Patent: May 26, 2026

(54) METHOD AND DEVICE IN NODES USED FOR WIRELESS COMMUNICATION

(71) Applicant: Apogee 5G Global, LLC, Plano, TX (US)

(72) Inventors: Zheng Liu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 293 days.

(21) Appl. No.: 17/880,609

(22) Filed: Aug. 3, 2022

(65) Prior Publication Data

US 2022/0386334 A1 Dec. 1, 2022

Related U.S. Application Data

(63) Continuation of application No. PCT/CN2021/075170, filed on Feb. 4, 2021.

(30) Foreign Application Priority Data

Feb. 14, 2020 (CN) .......................... 202010092986.5

(51) Int. Cl.
*H04L 27/26* (2006.01)
*H04W 24/08* (2009.01)
(Continued)

(52) U.S. Cl.
CPC ................... *H04W 72/1263* (2013.01); *H04L 27/26025* (2021.01); *H04W 24/08* (2013.01)

(58) Field of Classification Search
CPC ............. H04L 27/26; H04L 27/26025; H04W 24/08; H04W 72/04; H04W 72/0453; H04W 72/12; H04W 72/1263
See application file for complete search history.

(56) References Cited

U.S. PATENT DOCUMENTS 8,885,595 B2 * 11/2014 Han ...................... H04L 5/0055
370/210
9,628,237 B2 * 4/2017 Kim ...................... H04L 5/0098
(Continued)

FOREIGN PATENT DOCUMENTS

CN 104937865 A 9/2015
CN 105103585 A 11/2015
(Continued)

OTHER PUBLICATIONS

Supplementary European search report and European search opinion on application EP21753881, dated Jun. 5, 2023.
(Continued)

*Primary Examiner* — Alpus Hsu
(74) *Attorney, Agent, or Firm* — Volpe Koenig

(57) ABSTRACT

The present application discloses a method and a device in a node for wireless communications. A node receives first information, the first information being used to determine a target cell, the target cell scheduling a characteristic cell; monitors M Control Resource Elements in a first time window, the M Control Resource Elements being occupied by a control channel candidate; a sub-band to which any of the M Control Resource Elements belongs in frequency domain belongs to a first sub-band set; a serving cell to which any sub-band comprised in the first sub-band set belongs is in the scheduling cell set; a subcarrier spacing of a subcarrier comprised in the first sub-band set is equal to a first subcarrier spacing; the first subcarrier spacing is used to determine a time length of the first time window. The present disclosure guarantees the reception of scheduling.

20 Claims, 8 Drawing Sheets

100

Receiving first information — 101

Monitoring M Control Resource Elements in first time window — 102

(51) Int. Cl.
H04W 72/12 (2023.01)
H04W 72/1263 (2023.01)

(56) References Cited

U.S. PATENT DOCUMENTS

| | | | | |
|---|---|---|---|---|
| 2011/0312363 | A1 | 12/2011 | Kolding et al. | |
| 2016/0353440 | A1* | 12/2016 | Lee | H04W 72/0453 |
| 2018/0368116 | A1* | 12/2018 | Liao | H04L 5/0048 |
| 2019/0037569 | A1* | 1/2019 | Lee | H04W 72/0453 |
| 2019/0110303 | A1* | 4/2019 | Papasakellariou | |
| | | | | H04W 72/0453 |
| 2019/0141742 | A1 | 5/2019 | Zhou et al. | |
| 2019/0230498 | A1 | 7/2019 | Lee et al. | |
| 2020/0022119 | A1* | 1/2020 | Wang | H04W 72/12 |
| 2020/0187236 | A1* | 6/2020 | Moon | H04L 5/0094 |
| 2020/0236699 | A1* | 7/2020 | Nakashima | H04L 5/0053 |
| 2021/0045042 | A1* | 2/2021 | Nakashima | H04L 5/0094 |
| 2021/0092772 | A1* | 3/2021 | Nakashima | H04L 5/001 |
| 2021/0136770 | A1* | 5/2021 | Nakashima | H04W 72/53 |
| 2021/0227563 | A1* | 7/2021 | Xu | H04L 5/001 |
| 2021/0314973 | A1* | 10/2021 | Liu | H04W 72/52 |
| 2021/0410086 | A1* | 12/2021 | Davydov | H04L 27/2613 |

FOREIGN PATENT DOCUMENTS

| | | | |
|---|---|---|---|
| CN | 108282302 | A | 7/2018 |
| CN | 109152072 | A | 1/2019 |
| CN | 110138429 | A | 8/2019 |
| CN | 110474737 | A | 11/2019 |
| CN | 110505706 | A | 11/2019 |
| CN | 110620645 | A | 12/2019 |
| CN | 110740479 | A | 1/2020 |
| CN | 110740514 | A | 1/2020 |
| EP | 3557922 | A1 | 10/2019 |
| WO | 2018113739 | A1 | 6/2018 |
| WO | 2019210512 | A1 | 11/2019 |
| WO | 2019215932 | A1 | 11/2019 |
| WO | 2020015643 | A1 | 1/2020 |
| WO | 2022035238 | A1 | 2/2022 |

OTHER PUBLICATIONS

SR received in application No. PCT/CN2021/075170 dated Apr. 7, 2021.

Intel Corporation. "Remaining Details of PDCCH Search Spaces and CORESETs" 3GPP TSG-RAN WGI Meeting#92 RI-1802407, Feb. 17, 2018(Feb. 17, 2018), entire document.

1st SR received in application No. 202010092986.5 dated Jan. 23, 2022.

1st Office action received in application No. 202010092986.5 dated Jan. 27, 2022.

2nd SR received in application No. 202010092986.5 dated Jul. 28, 2022.

<Research on Uplink Interference Coordination Technology in LTE> Jianfei YU et.al Oct. 20, 2012 余建飞, 孙涌, 王士鑫, 等. LTE 上行干扰协调技 术的研究 [J]. 计算机工程, , 2012, 38(20): 56-59.

Third Generation Partnership Project, "Technical Specification Group Radio Access Network; NR; Physical channels and modulation (Release 16)," 3GPP TS 38.211 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; User Equipment (UE) radio access capabilities (Release 15)," 3GPP TS 38.306 V15.8.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

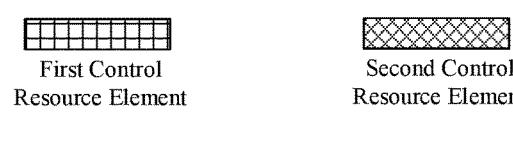
First Control
Resource Element
Second Control
Resource Element
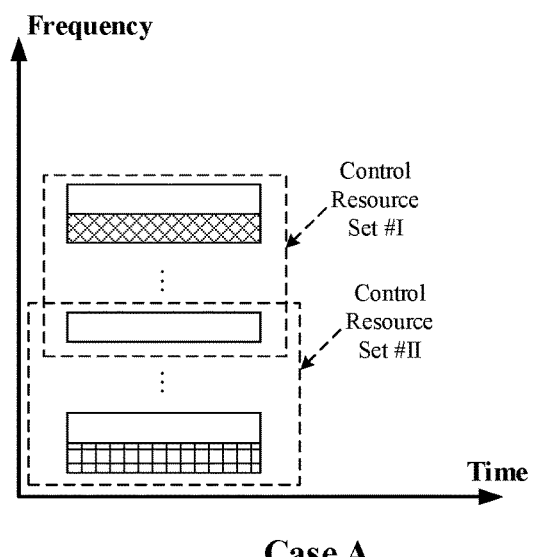
Case A
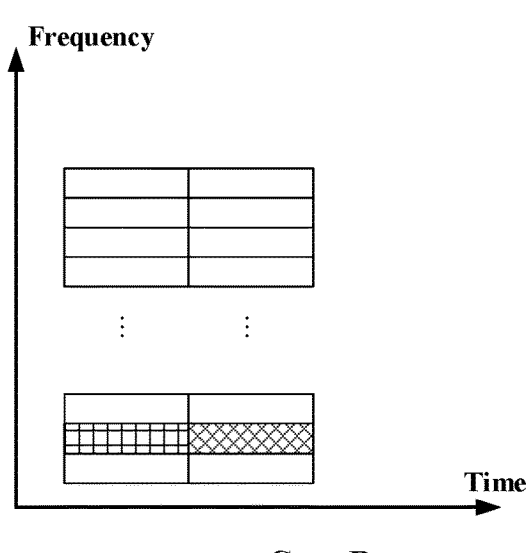
Case B
FIG. 8
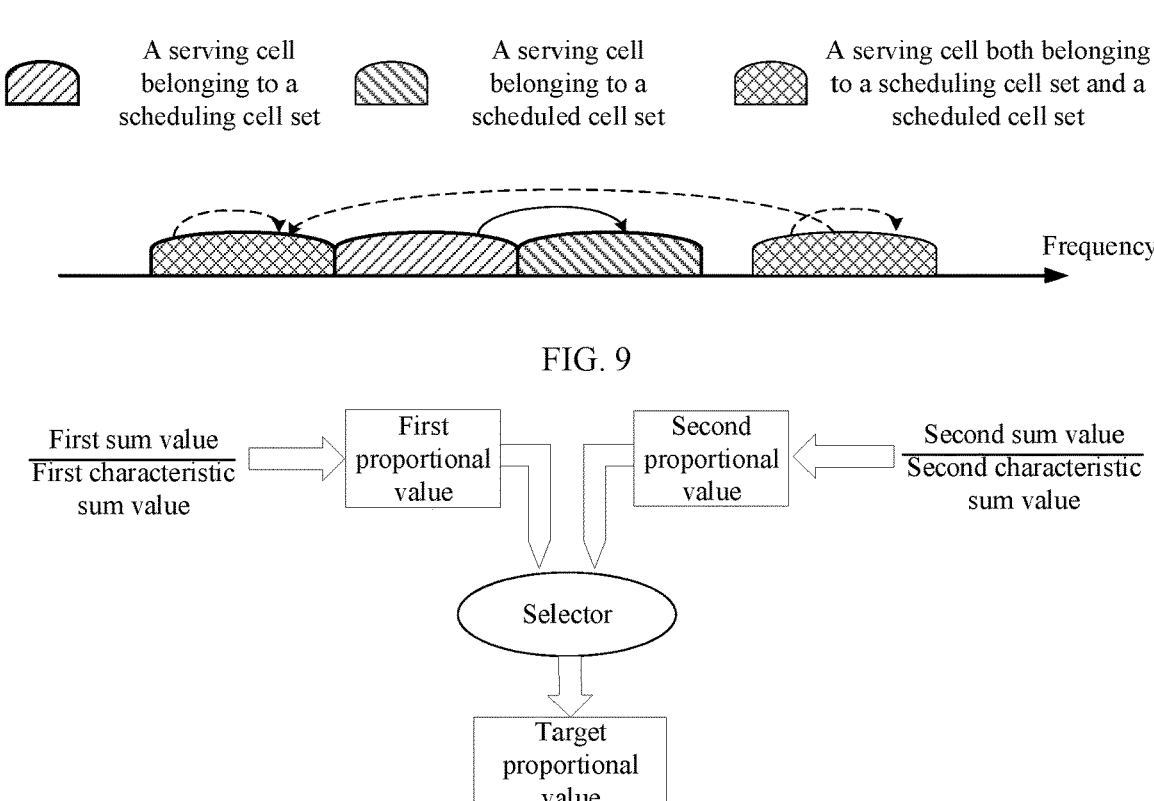
FIG. 9
FIG. 10 a serving cell in
first cell subset a serving cell in
second cell subset

Frequency

FIG. 11

First
proportional
value $\dfrac{\text{First sum value}}{\text{First characteristic sum value}}$  =  $\dfrac{\text{Second sum value}}{\text{Second characteristic sum value}}$ Second
proportional
value

FIG. 12

Second
factor

First
proportional
value $\dfrac{\text{First sum value}}{\text{First characteristic sum value}}$  $\begin{matrix}\neq\\=\end{matrix}$  $\dfrac{\text{Second sum value}}{\text{Second characteristic sum value}}$ Second
proportional
value

FIG. 13

Characteristic cell

Target cell $\text{Second factor} = \dfrac{\text{Third number}}{\text{Fourth number}}$ Frequency Fourth number            Third number

FIG. 14

| Subcarrier spacing index | Candidate parameter |
|---|---|
| 0 | 56 |
| 1 | 56 |
| 2 | 48 |
| 3 | 32 |

FIG. 15

METHOD AND DEVICE IN NODES USED FOR WIRELESS COMMUNICATION

CROSS REFERENCE TO RELATED APPLICATIONS

This application is the continuation of the International patent application No. PCT/CN2021/075170, filed on Feb. 4, 2021, which claims the priority benefit of Chinese Patent Application No. 202010092986.5 filed on February 14, the full disclosure of which is incorporated herein by reference.

BACKGROUND

Technical Field

The present application relates to transmission methods and devices in wireless communication systems, and in particular to a scheme and a device for multi-carrier transmission in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

To adapt to a wide range of application scenarios and meet different requirements, the 3GPP RAN #85 Plenary has also approved a Work Item (WI) of Dynamic spectrum sharing (DSS) under NR and a WI of Multi-Radio Dual-Connectivity (MR-DC) enhancement for supporting more flexible and efficient multi-carrier communications.

SUMMARY

In the multicarrier communication procedure, such as Carrier Aggregation (CA), Cross Carrier Scheduling is supported. In the networks backed by the existing standards, for instance R16 and old versions of Long Term Evolution (LTE) and New Radio (NR), for data transmissions in a Primary Component Carrier (PCC) or a Primary Cell (Pcell), only self-scheduling of the PCC can be supported rather than Cross Carrier Scheduling with a Secondary Component Carrier (SCC) or a Secondary Cell (Scell) serving as a scheduling carrier. A decision was made in a WI of Dynamic spectrum sharing (DSS) in R17 to support Cross Carrier Scheduling for a PCC by an SCC.

To address the issue of scheduling in a network supporting multi-carrier transmissions, the present application provides a solution. It should be noted that the description above only took dynamic spectrum sharing as a typical example or application scenario, but the present application also applies to other scenarios confronting similar problems, such as other multi-carrier transmissions or multi-channel transmissions, or networks having special requirements for data scheduling, where similar technical effects can be achieved. Additionally, the adoption of a unified solution for various scenarios, including but not limited to scenarios of dynamic spectrum sharing and multi-carrier transmissions, contributes to the reduction of hardcore complexity and costs. If no conflict is incurred, embodiments in the first node in the present application and the characteristics of the embodiments are also applicable to a second node, and vice versa. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:

receiving first information, the first information being used to determine a target cell, the target cell being used to schedule a characteristic cell; and monitoring M Control Resource Elements in a first time window, M being a positive integer greater than 1, any of the M Control Resource Elements being occupied by at least one control channel candidate;

herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

In one embodiment, at least one of whether the scheduling cell set comprises the target cell or whether the characteristic cell and the target cell are the same is used to determine the first threshold, which thus ensures that the number of Monitored Non-Overlapped Control Channel Elements (CCEs) shall not exceed the maximum channel estimation capability of the UE, when multiple serving cells can be used to schedule one serving cell, thus ensuring correct reception of PDCCH by the UE.

In one embodiment, at least one of whether the scheduling cell set comprises the target cell or whether the characteristic cell and the target cell are the same is used to determine the first threshold, which is used for setting the maximum number of Non-Overlapped Control Channel Elements (CCEs) monitored by the UE according to whether there are multiple serving cells scheduling one serving cell. When the number of Non-Overlapped Control Channel Elements (CCEs) monitored by the UE is not beyond the UE's capability, the limitations on channel estimation of the UE as it monitors PDCCH Candidates are not excessive, thus guaranteeing the channel estimation performance of the UE in the procedure of monitoring PDCCH candidates and reducing the Blocking Probability of PDCCH to the largest extent, improving the PDCCH transmission performance.

According to one aspect of the present application, the above method is characterized in that a first Control Resource Element is one of the M Control Resource Elements, and a second Control Resource Element is one of the M Control Resource Elements other than the first Control Resource Element; the first Control Resource Element and the second Control Resource Element respectively belong to different Control Resource Sets, or control channel candidates respectively occupying the first Control Resource Element and the second Control Resource Element occupy different starting symbols in time domain.

According to one aspect of the present application, the above method is characterized in further comprising:

receiving second information;

herein, the second information is used to determine a configured cell group, the configured cell group comprising multiple serving cells; the target cell belongs to the configured cell group, and the characteristic cell belongs to the configured cell group, with the characteristic cell being a primary cell in the configured cell group; a scheduled cell set comprises serving cell(s) scheduled by the serving cell(s) comprised in the scheduling cell set, the scheduled cell set comprising a positive integer number of serving cell(s); any serving cell comprised in the scheduling cell set belongs to the configured cell group, while any serving cell comprised in the scheduled cell set belongs to the configured cell group.

According to one aspect of the present application, the above method is characterized in that a target proportional value is used to determine the first threshold, the target proportional value being a positive number no greater than 1; the target proportional value is equal to either a first proportional value or a second proportional value; the first proportional value is equal to a ratio of a first sum value to a first characteristic sum value, while the second proportional value is equal to a ratio of a second sum value to a second characteristic sum value; the first sum value is a positive number, the first characteristic sum value is a positive number no less than the first sum value, while the second sum value is a positive number, the second characteristic sum value is a positive number no less than the second sum value, where the first proportional value and the second proportional value are unequal; at least one of whether the scheduling cell set comprises the target cell or whether the characteristic cell and the target cell are the same is used to determine the target proportional value between the first proportional value and the second proportional value.

According to one aspect of the present application, the above method is characterized in further comprising:

receiving third information;

herein, the third information is used to determine a first cell subset and a second cell subset, the first cell subset comprising a positive integer number of serving cell(s), and the second cell subset comprising a positive integer number of serving cell(s); a number of serving cell(s) belonging to the first cell subset comprised in the scheduled cell set is equal to a first number, while a number of serving cell(s) belonging to the second cell subset comprised in the scheduled cell set is equal to a second number; the first characteristic sum value is linear with a product of a number of serving cell(s) comprised in the second cell subset and a first factor, and the first characteristic sum value is linear with a number of serving cell(s) comprised in the first cell subset; the first sum value is linear with a product of the second number and the first factor, and the first sum value is linear with the first number; the first factor is configurable, or the first factor is pre-defined.

In one embodiment, serving cells comprised in the scheduled cell set is divided into serving cell(s) comprised in the first cell subset and serving cell(s) comprised in the second cell subset, thus when there are multiple serving cells scheduling a serving cell, the capability of having multiple Transmit Receive Points (TRPs) or Panels of each serving cell shall be taken into account when setting the maximum value of the number of Non-overlapped CCEs monitored by the UE, which ensures the performance of channel estimation for monitoring PDCCH Candidates when the capability of a serving cell exists for supporting Transmit Receive Points (TRPs) or multiple Panels.

According to one aspect of the present application, the above method is characterized in that the second sum value and the first sum value are equal, while the first characteristic sum value and the second characteristic sum value are unequal; a difference between the second characteristic sum value and the first characteristic sum value is pre-defined, or a difference between the second characteristic sum value and the first characteristic sum value is configurable.

In one embodiment, the second sum value and the first sum value are equal and a difference between the second characteristic sum value and the first characteristic sum value is pre-defined or configurable, which enables the UE's distribution of non-overlapped control channel elements under monitoring to change with whether there are multiple serving cells scheduling a serving cell, thus streamlining PDCCH design while guaranteeing the performance of channel estimation by the UE when monitoring PDCCH candidates, and also ensuring a same design to be reused for different application scenarios.

According to one aspect of the present application, the above method is characterized in further comprising:

receiving fourth information;

herein, the fourth information is used to determine a second factor, the second factor being a positive number less than 1, the second factor is used to determine the second sum value, the second sum value being unequal to the first sum value, the second characteristic sum value being equal to the first characteristic sum value.

According to one aspect of the present application, the above method is characterized in that the fourth information is used to determine a first candidate set and a second candidate set, the first candidate set comprising a positive integer number of control channel candidate(s), the second candidate set comprising a positive integer number of control channel candidate(s); each control channel candidate comprised in the first candidate set is a control channel candidate used for scheduling the characteristic cell on the target cell, while each control channel candidate comprised in the second candidate set is a control channel candidate used for scheduling the characteristic cell; a number of non-overlapped control resource elements occupied by control channel candidate(s) comprised in the first candidate set is equal to a third number, while a number of non-overlapped control resource elements occupied by control channel candidate(s) comprised in the second candidate set is equal to a fourth number; the second factor is linear with a ratio of the third number to the fourth number.

In one embodiment, by linearly associating the second factor with a ratio of the third number to the fourth number, it can be ensured that the distribution of monitored Non-Overlapped Control Channel Elements (CCEs) matches with the required number of Non-Overlapped Control Channel Elements (CCEs), so that the payload matching of PDCCH can be achieved with the channel estimation performance of monitoring PDCCH candidates being ensured, thus further reducing the PDCCH blocking rate as well as enhancing the PDCCH transmission performance.

According to one aspect of the present application, the above method is characterized in that the first subcarrier spacing is one of X candidate subcarrier spacings, X being a positive integer greater than 1; the X candidate subcarrier spacings respectively correspond to X candidate parameters, each of the X candidate parameters being a positive integer; a first parameter is a candidate parameter corresponding to the first subcarrier spacing among the X candidate parameters, the first threshold is equal to a target value being rounded down to a nearest integer, the first parameter being used to determine the target value.

According to one aspect of the present application, the above method is characterized in that the characteristic cell comprises a characteristic sub-band, the characteristic sub-band comprising a positive integer number of subcarrier(s), a subcarrier spacing of any subcarrier comprised in the characteristic sub-band is equal to a second subcarrier spacing, the first subcarrier spacing being unequal to the second subcarrier spacing.

According to one aspect of the present application, the above method is characterized in further comprising:

transmitting fifth information;

herein, the fifth information is used to indicate a first capability parameter, the first capability parameter being a positive integer; the first capability parameter is used to determine the first threshold.

The present application provides a method in a second node for wireless communications, comprising:

transmitting first information, the first information being used to indicate a target cell, the target cell being used to schedule a characteristic cell; and determining M Control Resource Elements in a first time window, M being a positive integer greater than 1, any of the M Control Resource Elements being occupied by at least one control channel candidate;

herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

According to one aspect of the present application, the above method is characterized in that a first Control Resource Element is one of the M Control Resource Elements, and a second Control Resource Element is one of the M Control Resource Elements other than the first Control Resource Element; the first Control Resource Element and the second Control Resource Element respectively belong to different Control Resource Sets, or control channel candidates respectively occupying the first Control Resource Element and the second Control Resource Element occupy different starting symbols in time domain.

According to one aspect of the present application, the above method is characterized in further comprising:

transmitting second information;

herein, the second information is used to indicate a configured cell group, the configured cell group comprising multiple serving cells; the target cell belongs to the configured cell group, and the characteristic cell belongs to the configured cell group, with the characteristic cell being a primary cell in the configured cell group; a scheduled cell set comprises serving cell(s) scheduled by the serving cell(s) comprised in the scheduling cell set, the scheduled cell set comprising a positive integer number of serving cell(s); any serving cell comprised in the scheduling cell set belongs to the configured cell group, while any serving cell comprised in the scheduled cell set belongs to the configured cell group.

According to one aspect of the present application, the above method is characterized in that a target proportional value is used to determine the first threshold, the target proportional value being a positive number no greater than 1; the target proportional value is equal to either a first proportional value or a second proportional value; the first proportional value is equal to a ratio of a first sum value to a first characteristic sum value, while the second proportional value is equal to a ratio of a second sum value to a second characteristic sum value; the first sum value is a positive number, the first characteristic sum value is a positive number no less than the first sum value, while the second sum value is a positive number, the second characteristic sum value is a positive number no less than the second sum value, where the first proportional value and the second proportional value are unequal; at least one of whether the scheduling cell set comprises the target cell or whether the characteristic cell and the target cell are the same is used to determine the target proportional value between the first proportional value and the second proportional value.

According to one aspect of the present application, the above method is characterized in further comprising:

transmitting third information;

herein, the third information is used to indicate a first cell subset and a second cell subset, the first cell subset comprising a positive integer number of serving cell(s), and the second cell subset comprising a positive integer number of serving cell(s); a number of serving cell(s) belonging to the first cell subset comprised in the scheduled cell set is equal to a first number, while a number of serving cell(s) belonging to the second cell subset comprised in the scheduled cell set is equal to a second number; the first characteristic sum value is linear with a product of a number of serving cell(s) comprised in the second cell subset and a first factor, and the first characteristic sum value is linear with a number of serving cell(s) comprised in the first cell subset; the first sum value is linear with a product of the second number and the first factor, and the first sum value is linear with the first number; the first factor is configurable, or the first factor is pre-defined.

According to one aspect of the present application, the above method is characterized in that the second sum value and the first sum value are equal, while the first characteristic sum value and the second characteristic sum value are unequal; a difference between the second characteristic sum value and the first characteristic sum value is pre-defined, or a difference between the second characteristic sum value and the first characteristic sum value is configurable.

According to one aspect of the present application, the above method is characterized in further comprising:

transmitting fourth information;

herein, the fourth information is used to indicate a second factor, the second factor being a positive number less than 1, the second factor is used to determine the second sum value, the second sum value being unequal to the first sum value, the second characteristic sum value being equal to the first characteristic sum value.

According to one aspect of the present application, the above method is characterized in that the fourth information is used to indicate a first candidate set and a second candidate set, the first candidate set comprising a positive integer number of control channel candidate(s), the second candidate set comprising a positive integer number of control channel candidate(s); each control channel candidate comprised in the first candidate set is a control channel candidate used for scheduling the characteristic cell on the target cell, while each control channel candidate comprised in the second candidate set is a control channel candidate used for scheduling the characteristic cell; a number of non-overlapped control resource elements occupied by control channel candidate(s) comprised in the first candidate set is equal to a third number, while a number of non-overlapped control resource elements occupied by control channel candidate(s) comprised in the second candidate set is equal to a fourth number; the second factor is linear with a ratio of the third number to the fourth number.

According to one aspect of the present application, the above method is characterized in that the first subcarrier spacing is one of X candidate subcarrier spacings, X being a positive integer greater than 1;

the X candidate subcarrier spacings respectively correspond to X candidate parameters, each of the X candidate parameters being a positive integer; a first parameter is a candidate parameter corresponding to the first subcarrier spacing among the X candidate parameters, the first threshold is equal to a target value being rounded down to a nearest integer, the first parameter being used to determine the target value.

According to one aspect of the present application, the above method is characterized in that the characteristic cell comprises a characteristic sub-band, the characteristic sub-band comprising a positive integer number of subcarrier(s), a subcarrier spacing of any subcarrier comprised in the characteristic sub-band is equal to a second subcarrier spacing, the first subcarrier spacing being unequal to the second subcarrier spacing.

According to one aspect of the present application, the above method is characterized in further comprising:

receiving fifth information;

herein, the fifth information is used to determine a first capability parameter, the first capability parameter being a positive integer; the first capability parameter is used to determine the first threshold.

The present application provides a first node for wireless communications, comprising:

a first transceiver, receiving first information, the first information being used to determine a target cell, the target cell being used to schedule a characteristic cell; and a first receiver, monitoring M Control Resource Elements in a first time window, M being a positive integer greater than 1, any of the M Control Resource Elements being occupied by at least one control channel candidate;

herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

The present application provides a second node for wireless communications, comprising:

a second transceiver, transmitting first information, the first information being used to indicate a target cell, the target cell being used to schedule a characteristic cell; and a first transmitter, determining M Control Resource Elements in a first time window, M being a positive integer greater than 1, any of the M Control Resource Elements being occupied by at least one control channel candidate;

herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

In one embodiment, the method in the present application has the following advantages:

The method provided in the present application is adopted, which ensures that the number of Monitored Non-Overlapped Control Channel Elements (CCEs) shall not exceed the maximum channel estimation capability of the UE, when multiple serving cells can be used to schedule one serving cell, thus ensuring correct reception of PDCCH by the UE.

The method in the present application is used for setting the maximum number of Non-Overlapped Control Channel Elements (CCEs) monitored by the UE according to whether there are multiple serving cells scheduling one serving cell. When the number of Non-Overlapped Control Channel Elements (CCEs) monitored by the UE is not beyond the UE's capability, the limitations on channel estimation of the UE as it monitors PDCCH Candidates are not excessive, thus guaranteeing the channel estimation performance of the UE in the procedure of monitoring PDCCH candidates and reducing the Blocking Probability of PDCCH to the largest extent, improving the PDCCH transmission performance.

The method provided in the present application is adopted, thus when there are multiple serving cells scheduling a serving cell, the capability of having multiple Transmit Receive Points (TRPs) or Panels of each serving cell shall be taken into account when setting the maximum value of the number of Non-overlapped CCEs monitored by the UE, which ensures the performance of channel estimation for monitoring PDCCH Candidates when the capability of a serving cell exists for supporting Transmit Receive Points (TRPs) or multiple Panels.

The method provided in the present application is adopted to enable the UE's distribution of non-overlapped control channel elements under monitoring to change with whether there are multiple serving cells scheduling a serving cell, thus streamlining PDCCH design while guaranteeing the performance of channel estimation by the UE when monitoring PDCCH candidates, and also ensuring a same design to be reused for different application scenarios.

With the method provided in the present application, it can be ensured that the distribution of monitored Non-Overlapped Control Channel Elements (CCEs) matches with the required number of Non-Overlapped Control Channel Elements (CCEs), so that the payload matching of PDCCH can be achieved with the channel estimation performance of monitoring PDCCH candidates being ensured, thus further reducing the PDCCH blocking rate as well as enhancing the PDCCH transmission performance.

BRIEF DESCRIPTION OF THE DRAWINGS

Other features, objects and advantages of the present application will become more apparent from the detailed description of non-restrictive embodiments taken in conjunction with the following drawings:

FIG. 8 illustrates a schematic diagram of a relationship between a first Control Resource Element and a second Control Resource Element according to one embodiment of the present application.

FIG. 9 illustrates a schematic diagram of a relationship between a scheduling cell set and a scheduled cell set according to one embodiment of the present application.

FIG. 10 illustrates a schematic diagram of a target proportional value according to one embodiment of the present application.

FIG. 11 illustrates a schematic diagram of a relationship between a first cell subset and a second cell subset according to one embodiment of the present application.

FIG. 12 illustrates a schematic diagram of a relationship between a first characteristic sum value and a second characteristic sum value according to one embodiment of the present application.

FIG. 13 illustrates a schematic diagram of a relationship between a second factor and a second sum value according to one embodiment of the present application.

FIG. 14 illustrates a schematic diagram of a second factor according to one embodiment of the present application.

FIG. 15 illustrates a schematic diagram of a relation between a first parameter and a first subcarrier spacing according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
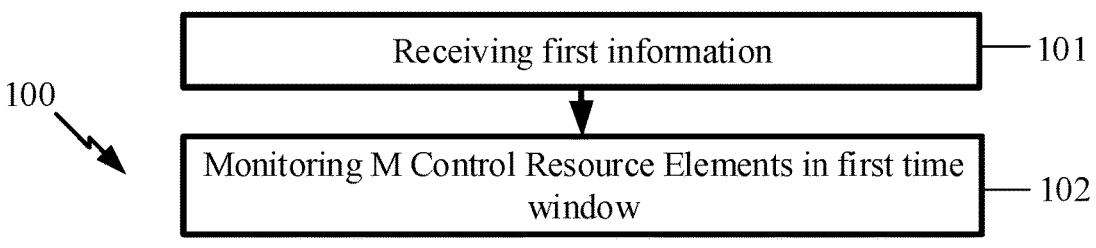
FIG. 1 illustrates a flowchart of first information and M Control Resource Elements according to one embodiment of the present application.

Embodiment 1 illustrates a flowchart of first information and M Control Resource Elements according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives first information in step 101, the first information being used to determine a target cell, the target cell being used to schedule a characteristic cell; the first node in the present application monitors M Control Resource Elements in a first time window in step 102, M being a positive integer greater than 1, any one of the M Control Resource Elements being occupied by a control channel candidate; herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

In one embodiment, the first information is transmitted via an air interface.

In one embodiment, the first information is transmitted via a radio interface.

In one embodiment, the first information comprises all or part of a Higher Layer signaling.

In one embodiment, the first information comprises all or part of a physical layer signaling.

In one embodiment, the first information comprises all or part of a Radio Resource Control (RRC) signaling.

In one embodiment, the first information comprises all or part of a Medium Access Control (MAC) layer signaling.

In one embodiment, the first information comprises all or part of a System Information Block (SIB).

In one embodiment, the first information is transmitted through a Downlink Shared Channel (DL-SCH).

In one embodiment, the first information is transmitted through a Physical Downlink Shared Channel (PDSCH).

In one embodiment, the first information is UE-Specific.

In one embodiment, the first information is Carrier Specific.

In one embodiment, the first information is configured per carrier.

In one embodiment, the first information is Serving Cell Specific.

In one embodiment, the first information is configured per serving cell.

In one embodiment, the first information comprises all or partial fields in a Downlink Control Information (DCI) signaling.

In one embodiment, the first information comprises an Information Element (IE) "CrossCarrierSchedulingConfig" in an RRC signaling.

In one embodiment, the first information comprises an Information Element (IE) "ServingCellConfig" in an RRC signaling.

In one embodiment, the first information comprises an Information Element (IE) "CrossCarrierSchedulingConfig" in an RRC signaling used for configuring a Primary Cell (Pcell).

In one embodiment, the first information comprises an Information Element (IE) "ServingCellConfig" in an RRC signaling used for configuring a Primary Cell (Pcell).

In one embodiment, the first information comprises a field "schedulingCellId" in an Information Element (IE) "CrossCarrierSchedulingConfig" in an RRC signaling.

In one embodiment, the first information comprises a field "schedulingCellId" in an Information Element (IE) "CrossCarrierSchedulingConfig" in an RRC signaling for configuring a Primary Cell (Pcell).

In one embodiment, the first information comprises a CHOICE of "own" or "other" in a field "schedulingCellInfo" in an Information Element (IE) "CrossCarrierSchedulingConfig" in an RRC signaling.

In one embodiment, the phrase of "the first information being used to determine a target cell" comprises the meaning that the first information is used by the first node in the present application to determine the target cell.

In one embodiment, the phrase of "the first information being used to determine a target cell" comprises the meaning that the first information is used to explicitly indicate the target cell.

In one embodiment, the phrase of "the first information being used to determine a target cell" comprises the meaning that the first information is used to implicitly indicate the target cell.

In one embodiment, the phrase of "the first information being used to determine a target cell" comprises the meaning that the first information is used to indirectly indicate the target cell.

In one embodiment, the phrase of "the first information being used to determine a target cell" comprises the meaning that the first information is used to indicate a Serving Cell Index (ServCellIndex) of the target cell In one embodiment, the phrase of "the first information being used to determine a target cell" comprises the meaning that the first information is used to indicate whether the target cell and the characteristic cell are the same.

In one embodiment, the phrase of "the first information being used to determine a target cell" comprises the meaning that the first information is used to indicate whether the target cell is the same as a serving cell to which frequency-domain resources occupied by a signal carrying the first information belong.

In one embodiment, the phrase of "the first information being used to determine a target cell" comprises the meaning that the first information is used to indicate whether the target cell and the characteristic cell are the same; when the target cell and the characteristic cell are different, the first information is also used to indicate a Serving Cell Index of the target cell.

In one embodiment, the phrase of "the first information being used to determine a target cell" comprises the meaning that the first information is used to indicate whether the target cell is the same as a serving cell to which frequency-domain resources occupied by a signal carrying the first information belong; when the target cell is different from the serving cell to which frequency-domain resources occupied by a signal carrying the first information belong, the first information is also used to indicate a Serving Cell Index of the target cell.

In one embodiment, a signal carrying the first information is transmitted on the characteristic cell.

In one embodiment, a signal carrying the first information is transmitted on a cell other than the characteristic cell.

In one embodiment, as described in the present application, a serving cell scheduling another serving cell means that a Physical Downlink Control Channel (PDCCH) transmitted on a serving cell schedules a signal on another serving cell.

In one embodiment, as described in the present application, a serving cell scheduling another serving cell means that a Physical Downlink Control Channel (PDCCH) transmitted on a serving cell schedules another serving cell.

In one embodiment, the target cell is a serving cell.

In one embodiment, the target cell corresponds to a Component Carrier (CC).

In one embodiment, the target cell is a serving cell in a Master Cell Group (MCG).

In one embodiment, the target cell is a serving cell in a Secondary Cell Group (SCG).

In one embodiment, the target cell is a serving cell corresponding to a Primary Component Carrier (PCC).

In one embodiment, the target cell is a Primary Cell (Pcell).

In one embodiment, the target cell is a Special Cell (Spcell).

In one embodiment, the target cell is a serving cell corresponding to a Secondary Component Carrier (SCC).

In one embodiment, the target cell is a Secondary Cell (Scell).

In one embodiment, the characteristic cell is a serving cell.

In one embodiment, the characteristic cell corresponds to a Component Carrier (CC).

In one embodiment, the characteristic cell is a serving cell in a Master Cell Group (MCG).

In one embodiment, the characteristic cell is a serving cell in a Secondary Cell Group (SCG).

In one embodiment, the characteristic cell is a serving cell corresponding to a Primary Component Carrier (PCC).

In one embodiment, the characteristic cell is a Primary Cell (Pcell).

In one embodiment, the characteristic cell is a Special Cell (Spcell).

In one embodiment, the characteristic cell is a Primary Cell (Pcell) in an MCG, or the characteristic cell is a Pcell in an SCG.

In one embodiment, the target cell and the characteristic cell are the same.

In one embodiment, the target cell and the characteristic cell are different.

In one embodiment, the characteristic cell and the target cell belong to a same Cell Group.

In one embodiment, the characteristic cell and the target cell belong to a same MCG.

In one embodiment, the characteristic cell and the target cell belong to a same SCG.

In one embodiment, the phrase of "the target cell being used to schedule a characteristic cell" comprises a meaning that a PDCCH transmitted on the target cell is used to schedule a signal transmitted on the characteristic cell.

In one embodiment, the phrase of "the target cell being used to schedule a characteristic cell" comprises a meaning that when the target cell and the characteristic cell are the same, a PDCCH transmitted on the target cell is used for self-scheduling a signal transmitted on the characteristic cell; when the target cell and the characteristic cell are different, a PDCCH transmitted on the target cell is used for cross-carrier scheduling a signal transmitted on the characteristic cell.

In one embodiment, the phrase of "the target cell being used to schedule a characteristic cell" comprises a meaning that the target cell is a Scheduling Cell for the characteristic cell.

In one embodiment, the phrase of "the target cell being used to schedule a characteristic cell" comprises a meaning that the characteristic cell is a Scheduled Cell for the target cell.

In one embodiment, the first time window is a slot.

In one embodiment, the first time window is a slot corresponding to the first subcarrier spacing.

In one embodiment, the first time window comprises a positive integer number of time-domain consecutive Orthogonal Frequency Division Multiplexing (OFDM) Symbols.

In one embodiment, the first time window comprises a positive integer number of time-domain consecutive Orthogonal Frequency Division Multiplexing (OFDM) Symbols corresponding to the first subcarrier spacing.

In one embodiment, the first time window is a span.

In one embodiment, the first time window is a span corresponding to the first subcarrier spacing.

In one embodiment, the first time window is a time interval with a minimum time interval length between earliest OFDM symbols in two PDCCH Occasions.

In one embodiment, time-domain resources occupied by any Control Resource Element among the M Control Resource Elements belong to the first time window.

In one embodiment, time-domain resources occupied by any Control Resource Element among the M Control Resource Elements are a part of the first time window.

In one embodiment, any Control Resource Element among the M Control Resource Elements is occupied by at least one control channel candidate (i.e., PDCCH Candidate).

In one embodiment, any of M1 control channel candidate(s) (i.e., PDCCH Candidate(s)) occupies one or more of the M Control Resource Elements, M1 being a positive integer.

In one embodiment, the M Control Resource Elements only comprise Control Resource Element(s) occupied by at least one control channel candidate (i.e., PDCCH Candidate).

In one embodiment, among the M Control Resource Elements there isn't any Control Resource Element unoccupied by a control channel candidate (i.e., PDCCH Candidate).

In one embodiment, each control channel candidate occupying at least one of the M Control Resource Elements is a Physical Downlink Control Channel (PDCCH) Candidate.

In one embodiment, each control channel candidate occupying at least one of the M Control Resource Elements is a Physical Downlink Control Channel (PDCCH) Candidate using a DCI Format.

In one embodiment, each control channel candidate occupying at least one of the M Control Resource Elements is a Physical Downlink Control Channel (PDCCH) Candidate using one or more given DCI Formats.

In one embodiment, each control channel candidate occupying at least one of the M Control Resource Elements is a time-frequency resource set that may carry DCI in a specific Format.

In one embodiment, each control channel candidate occupying at least one of the M Control Resource Elements is a radio resource set that may carry DCI in a specific Format, the radio resource set comprising at least time-frequency resources among time-frequency resources, code-domain resources or spatial resources.

In one embodiment, each control channel candidate occupying at least one of the M Control Resource Elements is a Monitored PDCCH Candidate.

In one embodiment, monitoring of the M Control Resource Elements is implemented by means of Channel Estimation of the M Control Resource Elements.

In one embodiment, monitoring of the M Control Resource Elements is implemented by means of Channel Equalization of the M Control Resource Elements.

In one embodiment, monitoring of the M Control Resource Elements is implemented by means of whether an independent Channel Estimation is required for each of the M Control Resource Elements.

In one embodiment, monitoring of the M Control Resource Elements is implemented by means of monitoring of control channel candidates (i.e., PDCCH Candidates) occupying the M Control Resource Elements.

In one embodiment, monitoring of the M Control Resource Elements is implemented by means of monitoring of all control channel candidates (i.e., PDCCH Candidates) occupying one or more of the M Control Resource Elements.

In one embodiment, monitoring of the M Control Resource Elements is implemented by means of decoding control channel candidates (i.e., PDCCH Candidates) occupying the M Control Resource Elements.

In one embodiment, the M Control Resource Elements are occupied by M1 control channel candidate(s), M1 being a positive integer; monitoring of the M Control Resource Elements is implemented by means of decoding the M1 control channel candidate(s).

In one embodiment, any of M1 control channel candidate(s) (i.e., PDCCH Candidate(s)) occupies one or more of the M Control Resource Elements, M1 being a positive integer; monitoring of the M Control Resource Elements is implemented by means of decoding the M1 control channel candidate(s).

In one embodiment, monitoring of the M Control Resource Elements is implemented by means of blind decoding control channel candidates (i.e., PDCCH Candidates) occupying the M Control Resource Elements.

In one embodiment, monitoring of the M Control Resource Elements is implemented by means of decoding and CRC of control channel candidates (i.e., PDCCH Candidates) occupying the M Control Resource Elements.

In one embodiment, monitoring of the M Control Resource Elements is implemented by means of decoding control channel candidates (i.e., PDCCH Candidates) occupying the M Control Resource Elements based on monitored one or more Downlink Control Information (DCI) Format(s).

In one embodiment, two independent Channel Estimations are required for any two Control Resource Elements among the M Control Resource Elements.

In one embodiment, Channel Estimations for any two Control Resource Elements among the M Control Resource Elements cannot be mutually reused.

In one embodiment, two independent Channel Equalizations are required for any two Control Resource Elements among the M Control Resource Elements.

In one embodiment, any Control Resource Element among the M Control Resource Elements is a Control Channel Element (CCE).

In one embodiment, any Control Resource Element among the M Control Resource Elements is a Non-Overlapped Control Channel Element (Non-Overlapped CCE).

In one embodiment, any two Control Resource Elements among the M Control Resource Elements are Non-Overlapped.

In one embodiment, any two Control Resource Elements among the M Control Resource Elements comprise equal numbers of time-frequency resource units.

In one embodiment, any two Control Resource Elements among the M Control Resource Elements comprise equal numbers of Resource Elements (REs).

In one embodiment, any Control Resource Element among the M Control Resource Elements comprises 6 Resource Element Groups (REGs).

In one embodiment, any Control Resource Element among the M Control Resource Elements comprises 6 Resource Element Groups (REGs), of which each REG comprises 9 Resource Elements (REs) used for transmitting data modulation symbols and 3 REs used for transmitting Reference Signals (RS).

In one embodiment, time-frequency resources occupied by any two Control Resource Elements among the M Control Resource Elements are orthogonal.

In one embodiment, there are two Control Resource Elements among the M Control Resource Elements by which time-frequency resources occupied are non-orthogonal.

In one embodiment, there are two Control Resource Elements among the M Control Resource Elements by which time-frequency resources occupied are the same.

In one embodiment, any two Control Resource Elements among the M Control Resource Elements occupy different time-frequency resources.

In one embodiment, the first sub-band set only comprises one sub-band.

In one embodiment, the first sub-band set comprises more than one sub-band.

In one embodiment, any sub-band comprised in the first sub-band set is a Bandwidth Part (BWP).

In one embodiment, any sub-band comprised in the first sub-band set is an Active Downlink Bandwidth Part (Active DL BWP).

In one embodiment, any sub-band comprised in the first sub-band set is contiguous frequency-domain resources having a same Numerology in a Carrier Bandwidth.

In one embodiment, any sub-band comprised in the first sub-band set is frequency-domain contiguous subcarriers having a same Numerology in a Carrier Bandwidth.

In one embodiment, any sub-band comprised in the first sub-band set is a subset comprising consecutive Common Resource Blocks (CRBs) for a given Numerology on a given carrier.

In one embodiment, a serving cell to which any sub-band comprised in the first sub-band set belongs is a serving cell corresponding to a carrier to which any sub-band comprised in the first sub-band set belongs.

In one embodiment, when the first sub-band set comprises multiple sub-bands, any two sub-bands comprised in the first sub-band set respectively belong to two different carriers.

In one embodiment, when the first sub-band set comprises multiple sub-bands, any two sub-bands comprised in the first sub-band set respectively belong to two different serving cells.

In one embodiment, when the first sub-band set comprises multiple sub-bands, there are two sub-bands in the first sub-band set respectively belonging to a same carrier.

In one embodiment, when the first sub-band set comprises multiple sub-bands, there are two sub-bands in the first sub-band set respectively belonging to a same serving cell.

In one embodiment, when the first sub-band set comprises multiple sub-bands, there are two Control Resource Elements among the M Control Resource Elements belonging to two different sub-bands comprised in the first sub-band set.

In one embodiment, frequency-domain resources occupied by any Control Resource Element among the M Control Resource Elements belong to a sub-band.

In one embodiment, any two Control Resource Elements among the M Control Resource Elements belong to a same sub-band comprised in the first sub-band set in frequency domain.

In one embodiment, the first sub-band set comprises a sub-band which does not comprise any of the M Control Resource Elements in frequency domain.

In one embodiment, each sub-band comprised in the first sub-band set comprises at least one of the M Control Resource Elements in frequency domain.

In one embodiment, any sub-band comprised in the first sub-band set is configurable.

In one embodiment, any sub-band comprised in the first sub-band set is configured by an Information Element (IE) "BWP-Downlink".

In one embodiment, any sub-band comprised in the first sub-band set is a BWP indicated by an Information Element (IE) "downlinkBWP-ToAddModList".

In one embodiment, time-frequency resources occupied by each Control Resource Element among the M Control Resource Elements are configured by a signaling "SearchSpace" and a signaling "ControlResourceSet".

In one embodiment, further comprising:

receiving sixth information;

herein, the sixth information is used to determine each sub-band in the first sub-band set and a subcarrier spacing of subcarriers comprised in each sub-band in the first sub-band set.

In one embodiment, further comprising:

receiving seventh information;

herein, the seventh information is used to determine time-frequency resources occupied by each Control Resource Element among the M Control Resource Elements.

In one embodiment, further comprising:

receiving seventh information;

herein, the seventh information is used to determine Q Control Resource Elements, any Control Resource Element among the M Control Resource Elements is one of the Q Control Resource Elements, where Q is a positive integer no less than the M; M is equal to the first threshold, the first threshold being used to determine the M Control Resource Elements from the Q Control Resource Elements.

In one embodiment, further comprising:

receiving seventh information;

herein, the seventh information is used to determine a sub-band in the first sub-band set to which time-frequency resources occupied by each Control Resource Element among the M Control Resource Elements belong.

In one embodiment, the scheduling cell set only comprises one serving cell.

In one embodiment, the scheduling cell set comprises more than one serving cell.

In one embodiment, any serving cell comprised in the scheduling cell set is an activated cell.

In one embodiment, the scheduling cell set comprises a serving cell which is a deactivated cell.

In one embodiment, any serving cell comprised in the scheduling cell set comprises an active BWP.

In one embodiment, the scheduling cell set comprises a serving cell which comprises a non-active BWP.

In one embodiment, a number of serving cells comprised in the scheduling cell set and a number of sub-bands comprised in the first sub-band set are equal.

In one embodiment, a number of serving cells comprised in the scheduling cell set and a number of sub-bands comprised in the first sub-band set are unequal.

In one embodiment, the phrase that "a serving cell to which any sub-band comprised in the first sub-band set belongs to the scheduling cell set" comprises a meaning that the scheduling cell set comprises a serving cell to which any sub-band comprised in the first sub-band set belongs.

In one embodiment, the phrase that "a serving cell to which any sub-band comprised in the first sub-band set belongs to the scheduling cell set" comprises a meaning that the scheduling cell set only comprises serving cell(s) to which each sub-band comprised in the first sub-band set belongs.

In one embodiment, the scheduling cell set also comprises a serving cell other than any serving cell to which a sub-band comprised in the first sub-band set belongs.

In one embodiment, the phrase that "a serving cell to which any sub-band comprised in the first sub-band set belongs to the scheduling cell set" comprises a meaning that the first sub-band set comprises W sub-bands, the scheduling cell set comprises W serving cells, the W serving cells respectively comprising the W sub-bands, where W is a positive integer.

In one embodiment, the phrase that "a serving cell to which any sub-band comprised in the first sub-band set belongs to the scheduling cell set" comprises a meaning that the first sub-band set comprises W sub-bands, the scheduling cell set comprises W serving cells, the W sub-bands respectively being BWPs of the W serving cells, where W is a positive integer.

In one embodiment, the phrase that "a serving cell to which any sub-band comprised in the first sub-band set belongs to the scheduling cell set" comprises a meaning that the first sub-band set comprises W sub-bands, the scheduling cell set comprises W serving cells, the W sub-bands respectively belonging to the W serving cells, where W is a positive integer.

In one embodiment, the phrase that "a serving cell to which any sub-band comprised in the first sub-band set belongs to the scheduling cell set" comprises a meaning that a serving cell corresponding to a carrier to which any sub-band comprised in the first sub-band set belongs is comprised in the scheduling cell set.

In one embodiment, when the first sub-band set comprises multiple sub-bands, any two sub-bands in the first sub-band set comprise subcarriers with an equal Subcarrier Spacing (SCS).

In one embodiment, a subcarrier spacing of any subcarrier comprised in any sub-band in the first sub-band set is equal to the first Subcarrier Spacing (SCS).

In one embodiment, the first sub-band set comprises multiple subcarriers, any two subcarriers comprised in the first sub-band set have equal Subcarrier Spacings (SCS).

In one embodiment, any sub-band comprised in the first sub-band set comprises a positive integer number of sub-carrier(s).

In one embodiment, any sub-band comprised in the first sub-band set comprises a positive integral multiple of 12 subcarriers.

In one embodiment, the first subcarrier spacing is equal to one of 15 kHz, 30 kHz, 60 kHz, 120 kHz or 240 kHz.

In one embodiment, the phrase that "the first subcarrier spacing is used to determine a time length of the first time window" comprises the meaning that the first subcarrier spacing is used by the first node in the present application to determine a time length of the first time window.

In one embodiment, the phrase that "the first subcarrier spacing is used to determine a time length of the first time window" comprises the meaning that the first time window is a slot, the first subcarrier spacing is used to determine a number of slots comprised in a subframe, a time length of the first time window being equal to a ratio of a length of a subframe to a number of slots comprised in a subframe.

In one embodiment, the phrase that "the first subcarrier spacing is used to determine a time length of the first time window" comprises the meaning that the first subcarrier spacing is used to determine a time length of each OFDM symbol comprised in the first time window.

In one embodiment, the phrase that "the first subcarrier spacing is used to determine a time length of the first time window" comprises the meaning that a Configuration Index of the first subcarrier spacing is used to determine a time length of the first time window.

In one embodiment, the phrase that "the first subcarrier spacing is used to determine a time length of the first time window" comprises the meaning that the first subcarrier spacing is used to determine a time length of the first time window according to a corresponding relation.

In one embodiment, the phrase that "the first subcarrier spacing is used to determine a time length of the first time window" comprises the meaning that the first subcarrier spacing is used to determine a time length of the first time window according to a table-based corresponding relation.

In one embodiment, further comprising:

receiving a first synchronization signal;

herein, the first synchronization signal is used to determine a position of the first time window in time domain.

In one embodiment, the first threshold can be equal to 0.

In one embodiment, the first threshold is greater than 0.

In one embodiment, when the first threshold is equal to 0, the first node does not monitor any Control Resource Element in the first time window.

In one embodiment, M is equal to the first threshold.

In one embodiment, M is less than the first threshold.

In one embodiment, the phrase that "at least one of whether the scheduling cell set comprises the target cell or whether the characteristic cell and the target cell are the same is used to determine the first threshold" means that whether the scheduling cell set comprises the target cell and whether the characteristic cell is the same as the target cell are used together to determine the first threshold.

In one embodiment, the phrase that "at least one of whether the scheduling cell set comprises the target cell or whether the characteristic cell and the target cell are the same is used to determine the first threshold" means that whether the scheduling cell set comprises the target cell is used to determine the first threshold.

In one embodiment, the phrase that "at least one of whether the scheduling cell set comprises the target cell or whether the characteristic cell and the target cell are the same is used to determine the first threshold" means that whether the characteristic cell is the same as the target cell is used to determine the first threshold.

In one embodiment, the phrase that "at least one of whether the scheduling cell set comprises the target cell or whether the characteristic cell and the target cell are the same is used to determine the first threshold" means that at least one of whether the scheduling cell set comprises the target cell or whether the characteristic cell is the same as the target cell is used by the first node in the present application to determine the first threshold.

In one embodiment, the phrase that "at least one of whether the scheduling cell set comprises the target cell or whether the characteristic cell and the target cell are the same is used to determine the first threshold" means that at least one of whether the scheduling cell set comprises the target cell or whether the characteristic cell is the same as the target cell is used to determine the first threshold according to conditions of decision.

In one embodiment, the phrase that "at least one of whether the scheduling cell set comprises the target cell or whether the characteristic cell and the target cell are the same is used to determine the first threshold" means that at least one of whether the scheduling cell set comprises the target cell or whether the characteristic cell is the same as the target cell is used to determine a calculation formula for the first threshold.

In one embodiment, when the first node in the present application detects a control channel candidate in the M Control Resource Elements, the detected control channel candidate is used for scheduling the characteristic cell.

In one embodiment, when the first node in the present application detects a control channel candidate in the M Control Resource Elements, the detected control channel candidate is used for scheduling a cell other than the characteristic cell.

In one embodiment, the phrase that "whether the scheduling cell set comprises the target cell" means that whether the scheduling cell set is used to schedule the characteristic cell.

In one embodiment, the phrase that "whether the scheduling cell set comprises the target cell" means that whether the scheduling cell set comprises a serving cell used to schedule the characteristic cell.

In one embodiment, the phrase that "whether the scheduling cell set comprises the target cell" means that whether the scheduling cell set is used to cross-carrier schedule the characteristic cell.

In one embodiment, the phrase that "whether the characteristic cell and the target cell are the same" means that whether the characteristic cell and the target cell are a same serving cell.

In one embodiment, the phrase that "whether the characteristic cell and the target cell are the same" means that whether the first node supports cross-carrier scheduling a Primary Cell (PCell).

In one embodiment, the phrase that "whether the characteristic cell and the target cell are the same" means that whether the first node supports cross-carrier scheduling a Primary SCG Cell (PSCell) in an SCG.

In one embodiment, the phrase that "whether the characteristic cell and the target cell are the same" means that whether the first node supports cross-carrier scheduling a Special Cell (Spcell).

Embodiment 2

Figure 2:
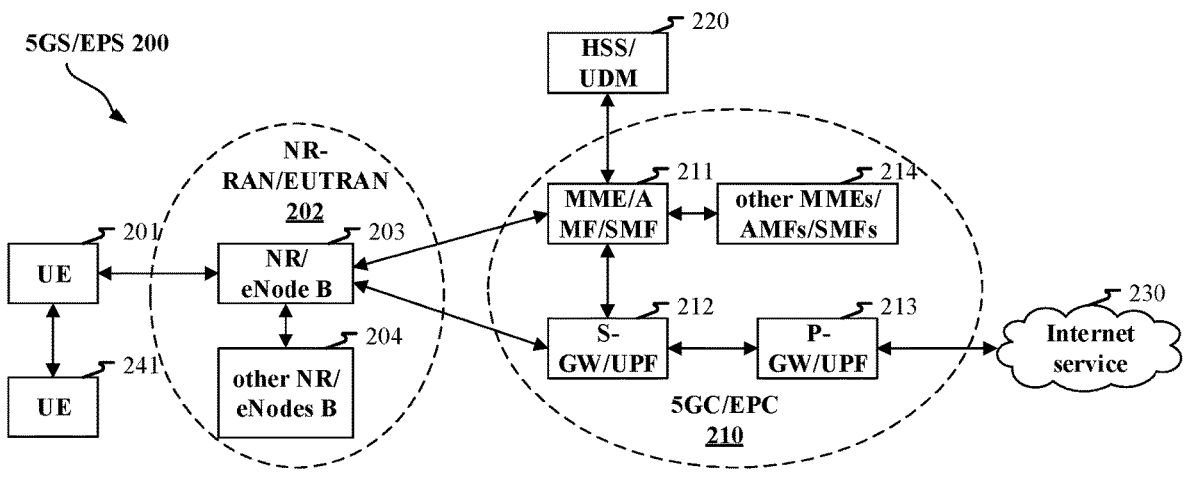
FIG. 2 illustrates a schematic diagram of a network architecture according to one embodiment of the present application.

Embodiment 2 illustrates a schematic diagram of a network architecture according to the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN comprises an NR/evolved node B (gNB/eNB) 203 and other gNBs (eNBs) 204. The gNB(eNB) 203 provides UE 201 oriented user plane and control plane terminations. The gNB(eNB) 203 may be connected to other gNBs(eNBs) 204 via an Xn/X2 interface (for example, backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected to the 5GC/EPC 210 via an S1/NG interface. The 5GC/EPC 210 comprises a Mobility Management Entity (MME)/ Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports multi-carrier transmission.

In one embodiment, the UE 201 supports transmissions in which an SCC cross-carrier schedules a PCC.

In one embodiment, the gNB(eNB) 203 corresponds to the second node in the present application.

In one embodiment, the gNB(eNB) 203 supports multi-carrier transmission.

In one embodiment, the gNB(eNB) 203 supports transmissions in which an SCC cross-carrier schedules a PCC.

Embodiment 3

Figure 3:
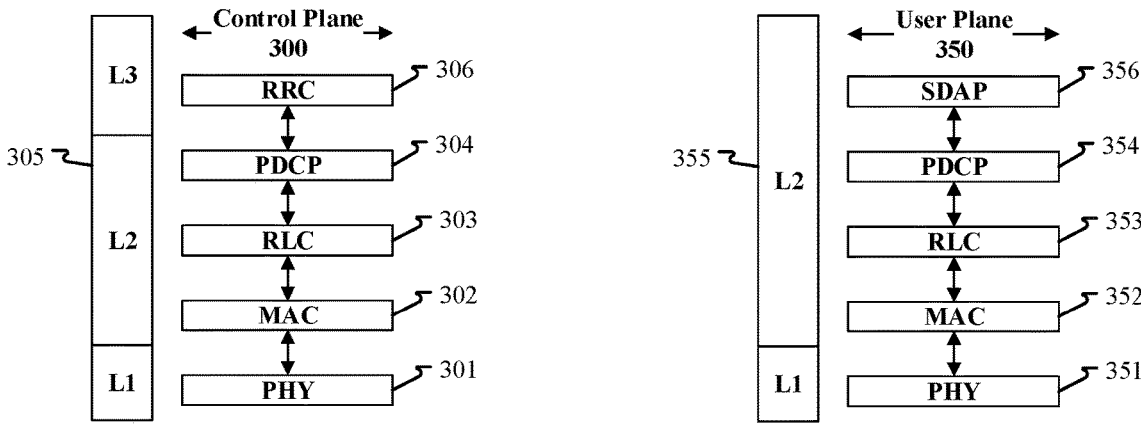
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, or gNB) and a second node (gNB, or UE) is represented by three layers, i.e., layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information in the present application is generated by the RRC306.

In one embodiment, the first information in the present application is generate by the MAC302 or the MAC352.

In one embodiment, the first information in the present application is generated by the PHY301 or the PHY351.

In one embodiment, the second information in the present application is generated by the RRC306.

In one embodiment, the second information in the present application is generate by the MAC302 or the MAC352.

In one embodiment, the second information in the present application is generated by the PHY301 or the PHY351.

In one embodiment, the third information in the present application is generated by the RRC306.

In one embodiment, the third information in the present application is generate by the MAC302 or the MAC352.

In one embodiment, the third information in the present application is generated by the PHY301 or the PHY351.

In one embodiment, the fourth information in the present application is generated by the RRC306.

In one embodiment, the fourth information in the present application is generate by the MAC302 or the MAC352.

In one embodiment, the fourth information in the present application is generated by the PHY301 or the PHY351.

In one embodiment, the fifth information in the present application is generated by the RRC306.

In one embodiment, the fifth information in the present application is generate by the MAC302 or the MAC352.

Embodiment 4

Figure 4:
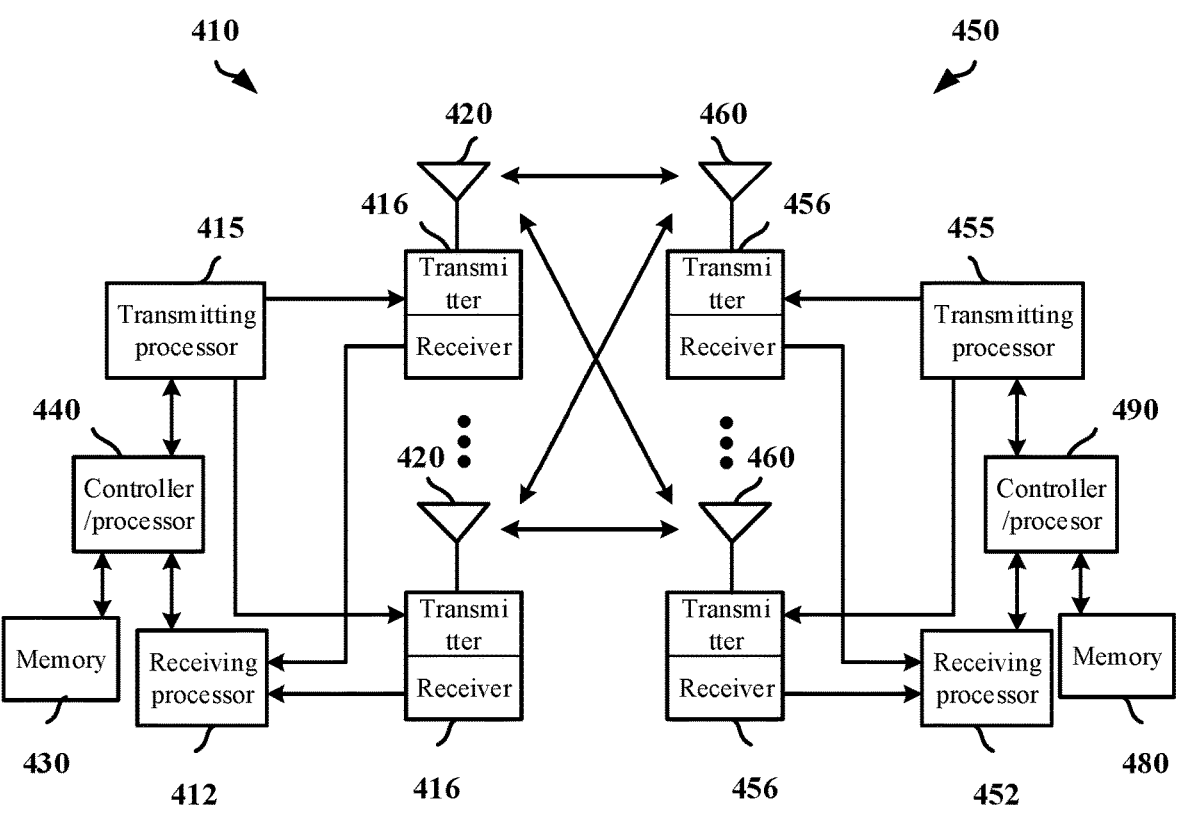
FIG. 4 illustrates a schematic diagram of a first node and a second node according to one embodiment of the present application.

Embodiment 4 illustrates a schematic diagram of a first node and a second node according to the present application, as shown in FIG. 4.

The first node (450) can comprise a controller/processor 490, a data source/buffer 480, a receiving processor 452, a transmitter/receiver 456 and a transmitting processor 455, where the transmitter/receiver 456 comprises an antenna 460.

The second node (410) can comprise a controller/processor 440, a data source/buffer 430, a receiving processor 412, a transmitter/receiver 416 and a transmitting processor 415, where the transmitter/receiver 416 comprises an antenna 420.

In Downlink (DL), a higher-layer packet, for instance higher-layer information contained in first information, second information, third information, and fourth information in the present application is provided to the controller/processor 440. The controller/processor 440 provides functions of the L2 layer and above. In DL, the controller/processor 440 provides header compression, encryption, packet segmentation and reordering, multiplexing between a logical channel and a transport channel and radio resource allocation of the first node 450 based on various priorities. The controller/processor 440 is responsible for HARQ operation, retransmission of a lost packet and a signaling to the first node device 450, for example, all of the first information, second information, third information and fourth information in the present application are generated in the controller/processor 440. The transmitting processor 415 performs various signal processing functions used for the L1 (that is, PHY), including coding, interleaving, scrambling, modulation, power control/allocation, precoding and physical layer control signaling generation, for example, the generation of physical layer signals of the first information, second information, third information, and fourth information in the present application are completed in the transmitting processor 415. When there is at least one control resource element among the M control resource elements in the present application being used for transmitting a control signaling, the generation of the transmitted control signaling is done in the transmitting processor 415. The modulation symbols are divided into parallel streams and each stream is mapped onto a corresponding multicarrier subcarrier and/or multicarrier symbol, which are then mapped to the antenna 420 by the transmitting processor 415 via the transmitter 416 and transmitted in the form of radio frequency signals. At the receiving end, each receiver 456 receives a radio frequency signal via a corresponding antenna 460, resumes baseband information modulated onto the radio frequency carriers and provides the baseband information to the receiving processor 452. The receiving processor 452 performs various signal reception processing functions of the L1 layer. The signal reception processing functions include receiving physical layer signals of the first information, second information, third information and fourth information in the present application and monitoring M Control Resource Elements in the present application, and demodulating multicarrier symbols in multicarrier symbol flows based on each modulation scheme (e.g., BPSK, QPSK), de-scrambling, decoding and de-interleaving to recover data or control signal transmitted by the second node 410 on a physical channel, and then providing the data and control signal to the controller/processor 490. The controller/processor 490 is in charge of L2 and layers above, and interprets the first information, second information, third information, and fourth information in the present application. The controller/processor can be associated with a memory 480 that stores program code and data. The memory 480 can be called a computer readable medium.

In UL, the data source/buffer 480 can be used to provide higher-layer data to the controller/processor 490. The data source/buffer 480 represents the L2 and above protocol layers. The controller/processor 490 provides header compression, encryption, packet segmentation and reordering as well as multiplexing between a logical channel and a transport channel based on radio resources allocation of the second node 410, thereby implementing the L2 layer protocols used for the user plane and the control plane. The controller/processor 490 is responsible for HARQ operation, retransmission of a lost packet and a signaling to the second node 410, besides the fifth information in the present application is generated in the controller/processor 490. The transmitting processor 455 performs various signal transmitting processing functions used for the L1 layer (i.e., PHY), e.g., a physical layer signal carrying fifth information is generated in the transmitting processor 455. The signal transmitting processing functions include sequence generation (for signals generated by a sequence), coding and interleaving to ensure a Forward Error Correction (FEC) of the UE 450 as well as modulation of baseband signals (for signals generated by bit blocks) based on each modulation scheme (e.g., BPSK, QPSK), dividing sequence-generated signals and modulation symbols into parallel streams and mapping each stream onto a corresponding multicarrier subcarrier and/or multicarrier symbol, which are then mapped to the antenna 460 by the transmitting processor 455 via the transmitter 456 and transmitted in the form of radio frequency signals. The receiver 416 receives a radio frequency signal via a corresponding antenna 420, each resumes baseband information modulated onto the radio frequency carriers and provides the baseband information to the receiving processor 412. The receiving processor 412 performs various signal receiving processing functions used for the L1 layer (i.e., PHY), which include receiving a physical layer signal carrying the fifth information in the present application, and also acquiring multicarrier symbol flows and demodulating multicarrier symbols within relative to sequence decorrelation and based on each modulation scheme (e.g., BPSK, QPSK), de-scrambling and de-interleaving to recover data or control signal originally transmitted by the first node 450 on a physical channel Next, the data and/or control signal are provided to the controller/processor 440. The controller/processor 440 provides functions of the L2 layer, including reading the fifth information in the present application. The controller/processor can be associated with a buffer 430 that stores program code and data, the buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least receives first information, the first information being used to determine a target cell, the target cell being used to schedule a characteristic cell; and monitors M Control Resource Elements in a first time window, M being a positive integer greater than 1, any one of the M Control Resource Elements being occupied by a control channel candidate; herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

In one embodiment, the first node 450 comprises a memory that stores computer readable instruction program, the computer readable instruction program generates an action when executed by at least one processor, which includes: receiving first information, the first information being used to determine a target cell, the target cell being used to schedule a characteristic cell; and monitoring M Control Resource Elements in a first time window, M being a positive integer greater than 1, any one of the M Control Resource Elements being occupied by a control channel candidate; herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

In one embodiment, the second node 410 comprises at least one processor and at least one memory. The at least one memory comprises computer program codes; the at least one memory and the computer program codes are configured to be used in collaboration with the at least one processor. The second node 410 at least transmits first information, the first information being used to determine a target cell, the target cell being used to schedule a characteristic cell; and determines M Control Resource Elements in a first time window, M being a positive integer greater than 1, any one of the M Control Resource Elements being occupied by a control channel candidate; herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

In one embodiment, the second node 410 comprises a memory that stores computer readable instruction program, the computer readable instruction program generates an action when executed by at least one processor, which includes: transmitting first information, the first information being used to determine a target cell, the target cell being used to schedule a characteristic cell; and determining M Control Resource Elements in a first time window, M being a positive integer greater than 1, any one of the M Control Resource Elements being occupied by a control channel candidate; herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

In one embodiment, the first node 450 is a UE.

In one embodiment, the first node 450 is a UE supporting multi-carrier transmissions.

In one embodiment, the first node 450 is a UE supporting an SCC in cross-carrier scheduling a PCC.

In one embodiment, the second node 410 is a base station (gNB/eNB).

In one embodiment, the second node 410 is a base station supporting multi-carrier transmissions.

In one embodiment, the second node 410 is a base station supporting an SCC in cross-carrier scheduling a PCC.

In one embodiment, the receiver 456 (comprising the antenna 460), the receiving processor 452 and the controller/processor 490 are used for receiving the first information in the present application.

In one embodiment, the receiver 456 (comprising the antenna 460) and the receiving processor 452 are used for monitoring the M Control Resource Elements in the present application.

In one embodiment, the receiver 456 (comprising the antenna 460), the receiving processor 452 and the controller/processor 490 are used for receiving the second information in the present application.

In one embodiment, the receiver 456 (comprising the antenna 460), the receiving processor 452 and the controller/processor 490 are used for receiving the third information in the present application.

In one embodiment, the receiver 456 (comprising the antenna 460), the receiving processor 452 and the controller/processor 490 are used for receiving the fourth information in the present application.

In one embodiment, the transmitter 456 (comprising the antenna 460), the transmitting processor 455 and the controller/processor 490 are used for transmitting the fifth information in the present application.

In one embodiment, the transmitter 416 (comprising the antenna 420), the transmitting processor 415 and the controller/processor 440 are used for transmitting the first information in the present application.

In one embodiment, the transmitter 416 (comprising the antenna 420) and the transmitting processor 415 are used for determining the M Control Resource Elements in the present application.

In one embodiment, the transmitter 416 (comprising the antenna 420), the transmitting processor 415 and the controller/processor 440 are used for transmitting the second information in the present application.

In one embodiment, the transmitter 416 (comprising the antenna 420), the transmitting processor 415 and the controller/processor 440 are used for transmitting the third information in the present application.

In one embodiment, the transmitter 416 (comprising the antenna 420), the transmitting processor 415 and the controller/processor 440 are used for transmitting the fourth information in the present application.

In one embodiment, the receiver 416 (comprising the antenna 420), the receiving processor 412 and the controller/processor 440 are used for receiving the fifth information in the present application.

Embodiment 5

Figure 5:
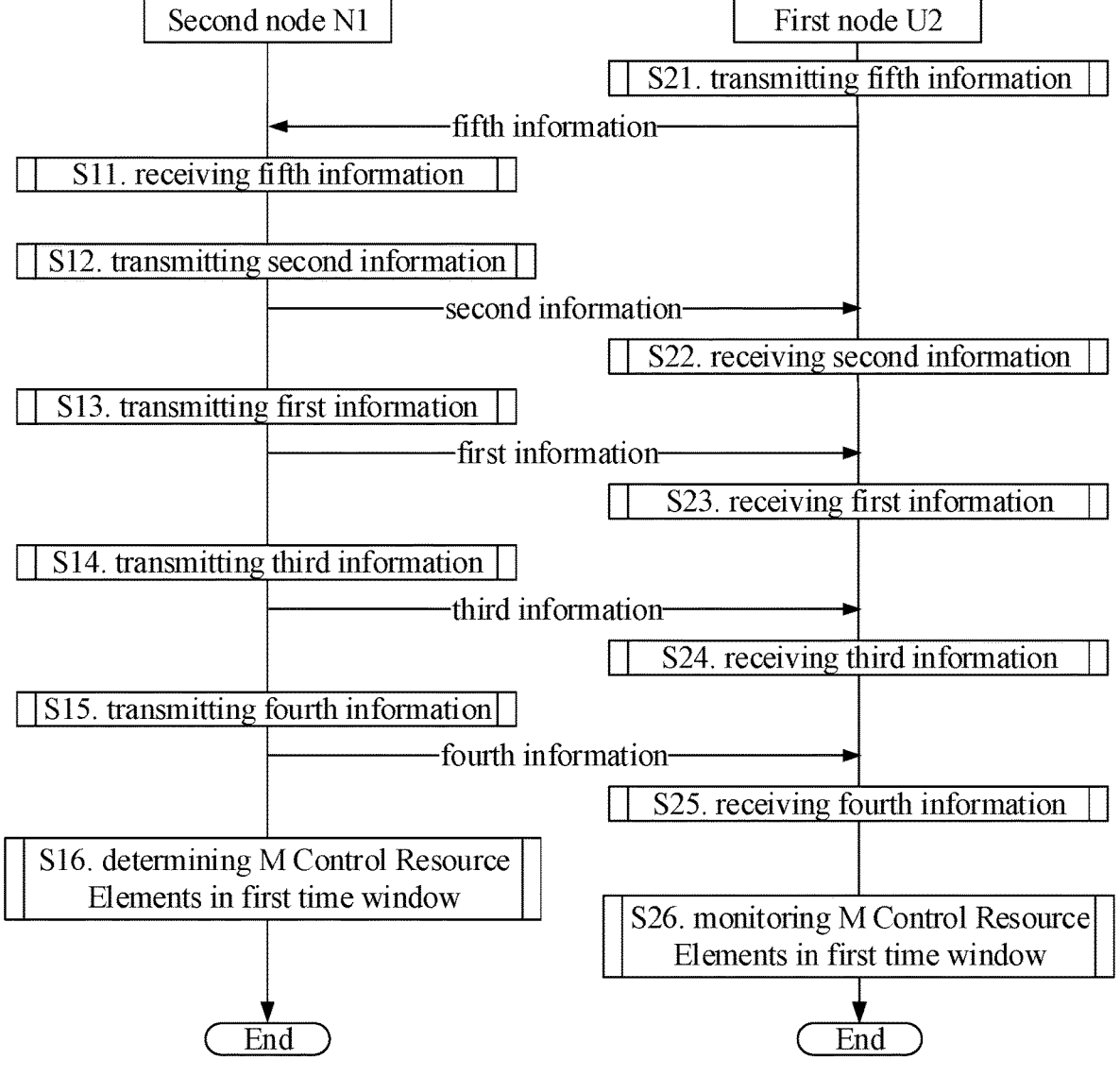
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, a second node N1 is a maintenance base station for a serving cell of a first node U2. It should be particularly noted that the sequence illustrated herein does not set any limit to the signal transmission order or implementation order in the present application.

The second node N1 receives fifth information in step S11, transmits second information in step S12, and transmits first information in step S13, transmits third information in step S14, transmits fourth information in step S15, and determines M Control Resource Elements in a first time window in step S16.

The first node U2 transmits fifth information in step S21, receives second information in step S22, and receives first information in step S23, receives third information in step S24, receives fourth information in step S25, and monitors M Control Resource Elements in a first time window in step S26.

In Embodiment 5, the first information is used to determine a target cell, the target cell being used to schedule a characteristic cell; M being a positive integer greater than 1, any one of the M Control Resource Elements being occupied by a control channel candidate; a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer; the second information is used to determine a configured cell group, the configured cell group comprising multiple serving cells; the third information is used to determine a first cell subset and a second cell subset, the first cell subset comprising a positive integer number of serving cell(s), and the second cell subset comprising a positive integer number of serving cell(s); the fourth information is used to determine a second factor, the second factor being a positive number less than 1; the fifth information is used to indicate a first capability parameter, the first capability parameter being a positive integer; the first capability parameter is used to determine the first threshold.

In one embodiment, the second information is transmitted via an air interface.

In one embodiment, the second information is transmitted via a radio interface.

In one embodiment, the second information comprises all or part of a Higher Layer signaling.

In one embodiment, the second information comprises all or part of a physical layer signaling.

In one embodiment, the second information comprises all or part of a Radio Resource Control (RRC) signaling.

In one embodiment, the second information comprises all or part of a Medium Access Control (MAC) layer signaling.

In one embodiment, the second information comprises all or part of a System Information Block (SIB).

In one embodiment, the second information is transmitted through a Downlink Shared Channel (DL-SCH).

In one embodiment, the second information is transmitted through a Physical Downlink Shared Channel (PDSCH).

In one embodiment, the second information is Cell-Specific.

In one embodiment, the second information is UE-Specific.

In one embodiment, the second information is configured per serving cell.

In one embodiment, the second information comprises all or partial fields in a Downlink Control Information (DCI) signaling.

In one embodiment, the second information and the first information are carried by two different RRC signalings.

In one embodiment, the second information and the first information are carried by two different IEs in a same RRC signaling.

In one embodiment, the second information and the first information are carried by two different fields in a same IE in a same RRC signaling.

In one embodiment, the second information belongs to an Information Element (IE) "CellGroupConfig" in an RRC signaling.

In one embodiment, the second information belongs to a field "sCellToAddModList" in an Information Element (IE) "CellGroupConfig" in an RRC signaling.

In one embodiment, the second information belongs to a field "sCellToReleaseList" in an Information Element (IE) "CellGroupConfig" in an RRC signaling.

In one embodiment, the phrase that "the second information is used to determine a configured cell group" comprises the meaning that the second information is used by the first node in the present application to determine the configured cell group.

In one embodiment, the phrase that "the second information is used to determine a configured cell group" comprises the meaning that the second information is used to explicitly indicate the configured cell group.

In one embodiment, the phrase that "the second information is used to determine a configured cell group" comprises the meaning that the second information is used to implicitly indicate the configured cell group.

In one embodiment, the phrase that "the second information is used to determine a configured cell group" comprises the meaning that the second information is used to indirectly indicate the configured cell group.

In one embodiment, the third information is transmitted via an air interface.

In one embodiment, the third information is transmitted via a radio interface.

In one embodiment, the third information comprises all or part of a Higher Layer signaling.

In one embodiment, the third information comprises all or part of a physical layer signaling.

In one embodiment, the third information comprises all or part of a Radio Resource Control (RRC) signaling.

In one embodiment, the third information comprises all or part of a Medium Access Control (MAC) layer signaling.

In one embodiment, the third information comprises all or part of a System Information Block (SIB).

In one embodiment, the third information is transmitted through a Downlink Shared Channel (DL-SCH).

In one embodiment, the third information is transmitted through a Physical Downlink Shared Channel (PDSCH).

In one embodiment, the third information is Cell-Specific.

In one embodiment, the third information is UE-Specific.

In one embodiment, the third information is configured per serving cell.

In one embodiment, the third information comprises all or partial fields in a Downlink Control Information (DCI) signaling.

In one embodiment, the third information comprises a field "CORESETPoolIndex" in an Information Element (IE) "ControlResourceSet" in an IE "PDCCH-Config" in an RRC signaling.

In one embodiment, the third information comprises an Information Element (IE) "PDCCH-Config" in an RRC signaling.

In one embodiment, the third information comprises an Information Element (IE) "ControlResourceSet" in an IE "PDCCH-Config" in an RRC signaling.

In one embodiment, the third information and the first information are carried by two different RRC signalings.

In one embodiment, the third information and the first information are carried by two different IEs in a same RRC signaling.

In one embodiment, the third information and the first information are carried by two different fields in a same IE in a same RRC signaling.

In one embodiment, the second information and the third information are carried by two different RRC signalings.

In one embodiment, the second information and the third information are carried by two different IEs in a same RRC signaling.

In one embodiment, the second information and the third information are carried by two different fields in a same IE in a same RRC signaling.

In one embodiment, the phrase that "the third information is used to determine a first cell subset and a second cell subset" comprises the meaning that the third information is used by the first node in the present application to determine the first cell subset and the second cell subset.

In one embodiment, the phrase that "the third information is used to determine a first cell subset and a second cell subset" comprises the meaning that the third information is used to determine CORESET (i.e., Control Resource Set) Pool Index(es) provided to serving cell(s) comprised in the first cell subset, where each of the CORESET Pool Index(es) provided to the serving cell(s) comprised in the first cell subset is equal to a first set index; the third information is used to determine CORESET Pool Index(es) provided to serving cell(s) comprised in the second cell subset, where each of the CORESET Pool Index(es) provided to the serving cell(s) comprised in the second cell subset is equal to a second set index; the first set index and the second set index are unequal.

In one embodiment, the phrase that "the third information is used to determine a first cell subset and a second cell subset" comprises the meaning that the third information is used to determine a number of Control Resource Set(s) (CORESET(s)) provided to serving cell(s) comprised in the first cell subset, where the number of CORESET(s) provided to each serving cell comprised in the first cell subset is equal to a first set number; the third information is used to determine a number of Control Resource Set(s) (CORESET(s)) provided to each serving cell comprised in the second cell subset, where the number of CORESET(s) provided to each serving cell comprised in the second cell subset is equal to a second set number; the first set number and the second set number are unequal.

In one embodiment, the phrase that "the third information is used to determine a first cell subset and a second cell subset" comprises the meaning that the third information comprises P sub-information-blocks, where P is equal to a sum of a number of serving cell(s) comprised in the first cell subset and a number of serving cell(s) comprised in the second cell subset; the P sub-information-blocks are respectively for P serving cells comprised in the first cell subset and the second cell subset; any of the P sub-information-blocks is used to determine a Control Resource Set (CORESET) provided to a corresponding serving cell among the P serving cells; a number of CORESET(s) provided to serving cell(s) comprised in the first cell subset is equal to a first set number, a number of CORESET(s) provided to serving cell(s) comprised in the second cell subset is equal to a second set number, where the first set number and the second set number are unequal.

In one embodiment, the phrase that "the third information is used to determine a first cell subset and a second cell subset" comprises the meaning that the third information is used to determine P sub-information-blocks, where P is equal to a sum of a number of serving cell(s) comprised in the first cell subset and a number of serving cell(s) comprised in the second cell subset; the P sub-information-blocks are respectively for P serving cells comprised in the first cell subset and the second cell subset; any of the P sub-information-blocks is used to determine a Control Resource Set (CORESET) Pool Index provided to a corresponding serving cell among the P serving cells; a CORESET Pool Index provided to each serving cell comprised in the first cell subset is equal to "0", a CORESET Pool Index provided to each serving cell comprised in the second cell subset is equal to "1".

In one embodiment, the third information comprises P sub-information-blocks, where P is equal to a sum of a number of serving cell(s) comprised in the first cell subset and a number of serving cell(s) comprised in the second cell subset; the P sub-information-blocks are respectively for P serving cells comprised in the first cell subset and the second cell subset.

In one embodiment, the fourth information is transmitted via an air interface.

In one embodiment, the fourth information is transmitted via a radio interface.

In one embodiment, the fourth information comprises all or part of a Higher Layer signaling.

In one embodiment, the fourth information comprises all or part of a physical layer signaling.

In one embodiment, the fourth information comprises all or part of a Radio Resource Control (RRC) signaling.

In one embodiment, the fourth information comprises all or part of a Medium Access Control (MAC) layer signaling.

In one embodiment, the fourth information is transmitted through a Downlink Shared Channel (DL-SCH).

In one embodiment, the fourth information is transmitted through a Physical Downlink Shared Channel (PDSCH).

In one embodiment, the fourth information is UE-Specific.

In one embodiment, the fourth information is configured per serving cell.

In one embodiment, the fourth information comprises all or partial fields in a Downlink Control Information (DCI) signaling.

In one embodiment, the third information and the fourth information are carried by two different RRC signalings.

In one embodiment, the third information and the fourth information are carried by two different IEs in a same RRC signaling.

In one embodiment, the third information and the fourth information are carried by two different fields in a same IE in a same RRC signaling.

In one embodiment, the phrase that "the fourth information is used to determine a second factor" comprises the meaning that the fourth information is used by the first node in the present application to determine the second factor.

In one embodiment, the phrase that "the fourth information is used to determine a second factor" comprises the meaning that the fourth information is used for explicitly indicating the second factor.

In one embodiment, the phrase that "the fourth information is used to determine a second factor" comprises the meaning that the fourth information is used for implicitly indicating the second factor.

In one embodiment, the phrase that "the fourth information is used to determine a second factor" comprises the meaning that the fourth information is used for indirectly indicating the second factor.

In one embodiment, the phrase that "the fourth information is used to determine a second factor" is implemented via the claim 8 in the present application.

Embodiment 6

Figure 6:
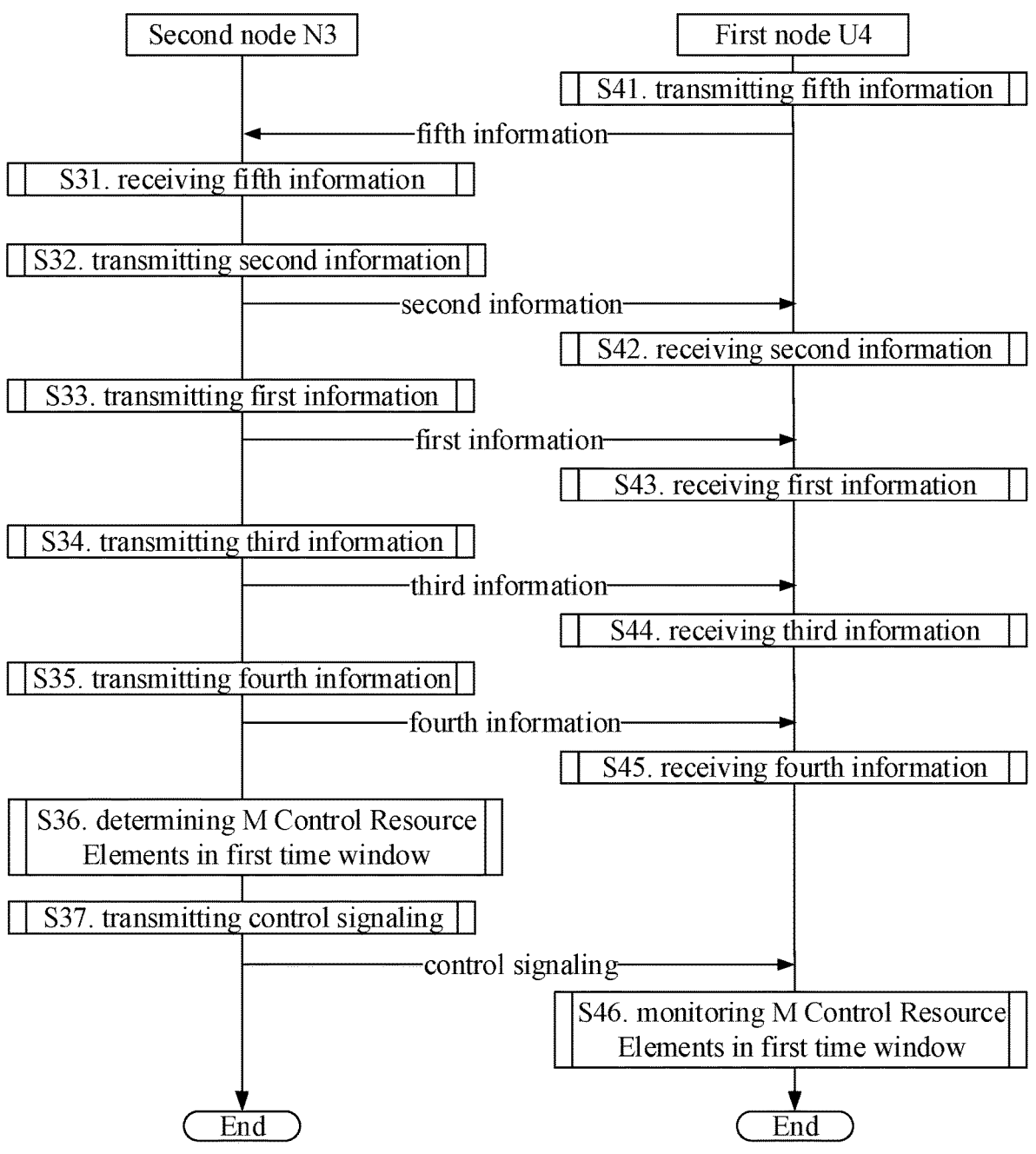
FIG. 6 illustrates a flowchart of radio signal transmission according to another embodiment of the present application.

Embodiment 6 illustrates a flowchart of signal transmission according to another embodiment of the present application, as shown in FIG. 6. In FIG. 6, a second node N3 is a maintenance base station for a serving cell of a first node U4. It should be particularly noted that the sequence illustrated herein does not set any limit to the signal transmission order or implementation order in the present application.

The second node N3 receives fifth information in step S31, transmits second information in step S32, and transmits first information in step S33, transmits third information in step S34, and transmits fourth information in step S35, determines M Control Resource Elements in a first time window in step S36, and transmits a control signaling in step S37.

The first node U4 transmits fifth information in step S41, receives second information in step S42, and receives first information in step S43, receives third information in step S44, receives fourth information in step S45, and monitors M Control Resource Elements in a first time window in step S46.

In Embodiment 6, the first information is used to determine a target cell, the target cell being used to schedule a characteristic cell; M being a positive integer greater than 1, any one of the M Control Resource Elements being occupied by a control channel candidate; a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer; the second information is used to determine a configured cell group, the configured cell group comprising multiple serving cells; the third information is used to determine a first cell subset and a second cell subset, the first cell subset comprising a positive integer number of serving cell(s), and the second cell subset comprising a positive integer number of serving cell(s); the fourth information is used to determine a second factor, the second factor being a positive number less than 1; the fifth information is used to indicate a first capability parameter, the first capability parameter being a positive integer; the first capability parameter is used to determine the first threshold; the control signaling occupies one or more Control Resource Elements of the M Control Resource Elements.

In one embodiment, the fifth information is transmitted via an air interface.

In one embodiment, the fifth information is transmitted via a radio interface.

In one embodiment, the fifth information comprises all or part of a Higher Layer signaling.

In one embodiment, the fifth information comprises all or part of a physical layer signaling.

In one embodiment, the fifth information comprises all or part of a Radio Resource Control (RRC) signaling.

In one embodiment, the fifth information comprises all or part of a Medium Access Control (MAC) layer signaling.

In one embodiment, the fifth information is transmitted through an Uplink Shared Channel (UL-SCH).

In one embodiment, the fifth information is transmitted through a Physical Uplink Shared Channel (PUSCH).

In one embodiment, the fifth information is UE-Specific.

In one embodiment, the fifth information is Carrier Specific.

In one embodiment, the fifth information is used to indicate a capability of the first node in the present application.

In one embodiment, the fifth information is used to indicate a CA or Dual Connectivity (DC) capability of the first node in the present application.

In one embodiment, the fifth information is used to indicate a blind detecting capability of the first node in the present application.

In one embodiment, the fifth information comprises an IE "Phy-Parameters".

In one embodiment, the fifth information comprises a field "pdcch-BlindDetectionCA-r16" in an IE "Phy-Parameters".

In one embodiment, the fifth information comprises a field "pdcch-BlindDetectionCA-r15" in an IE "Phy-Parameters".

In one embodiment, the fifth information comprises a field "pdcch-BlindDetectionCA-r17" in an IE "Phy-Parameters".

In one embodiment, the fifth information comprises a field "pdcch-BlindDetectionCA" in an IE "Phy-Parameters".

In one embodiment, the fifth information comprises a field "pdcch-BlindDetectionNRDC" in an IE "Phy-Parameters".

In one embodiment, the fifth information comprises a field "pdcch-BlindDetectionMCG-UE" in an IE "Phy-Parameters".

In one embodiment, the fifth information comprises a field "pdcch-BlindDetectionSCG-UE" in an IE "Phy-Parameters".

In one embodiment, the phrase that "the fifth information is used to indicate a first capability parameter" comprises the meaning that the fifth information is used by the first node in the present application to determine the first capability parameter.

In one embodiment, the phrase that "the fifth information is used to indicate a first capability parameter" comprises the meaning that the fifth information is used for explicitly indicating the first capability parameter.

In one embodiment, the phrase that "the fifth information is used to indicate a first capability parameter" comprises the meaning that the fifth information is used for implicitly indicating the first capability parameter.

In one embodiment, the phrase that "the fifth information is used to indicate a first capability parameter" comprises the meaning that the fifth information is used for indirectly indicating the first capability parameter.

In one embodiment, the first capability parameter is a number of serving cells on which a maximum number of Blind Decodings (BDs) performed can be supported by the first node.

In one embodiment, the first capability parameter is a number of serving cells on which a maximum number of Blind Decodings (BDs) performed can be supported by the first node in a Cell Group.

In one embodiment, the first capability parameter is a number of serving cells on which a maximum number of Blind Decodings (BDs) performed can be supported by the first node in a Master Cell Group (MCG).

In one embodiment, the first capability parameter is a number of serving cells on which a maximum number of Blind Decodings (BDs) performed can be supported by the first node in a Secondary Cell Group (SCG).

In one embodiment, the first capability parameter is a number of serving cells.

In one embodiment, the phrase that "the first capability parameter is used to determine the first threshold" comprises a meaning that the target value in the present application is directly proportional to the first capability parameter.

In one embodiment, the phrase that "the first capability parameter is used to determine the first threshold" comprises a meaning that the first threshold is directly proportional to the first capability parameter.

In one embodiment, the phrase that "the first capability parameter is used to determine the first threshold" comprises a meaning that the first capability parameter, the target proportional value in the present application and the first parameter in the present application are used together to determine the first threshold.

In one embodiment, the phrase that "the first capability parameter is used to determine the first threshold" comprises a meaning that the first capability parameter, the target proportional value in the present application and the first parameter in the present application are used together to determine the target value in the present application.

In one embodiment, the phrase that "the first capability parameter is used to determine the first threshold" comprises a meaning that a product of the first capability parameter, the target proportional value in the present application and the first parameter in the present application is equal to the target value in the present application.

In one embodiment, the phrase that "the first capability parameter is used to determine the first threshold" is implemented by means of the formula as follows:

$$C_{PDCCH}^{total,slot,\mu} = \left\lfloor N_{cells}^{cap} \cdot C_{PDCCH}^{max,slot,\mu} \cdot P_{cells}^{DL,\mu} \right\rfloor$$

herein, $$C_{PDCCH}^{total,slot,\mu}$$

denotes the first threshold, $$N_{cells}^{cap} \cdot C_{PDCCH}^{max,slot,\mu} \cdot P_{cells}^{DL,\mu}$$

denotes the target value, $$C_{PDCCH}^{max,slot,\mu}$$

denotes the first parameter, $$P_{cells}^{DL,\mu}$$

denotes the target proportional value in the present application, $$N_{cells}^{cap}$$

denotes the first capability parameter in the present application, and $\mu$ denotes an index of the first subcarrier spacing.

In one embodiment, a number of serving cells comprised in the configured cell group in the present application is larger than the first capability parameter.

In one embodiment, a number of serving cells comprised in the configured cell group in the present application is equal to the first capability parameter.

In one embodiment, a number of serving cells comprised in the configured cell group in the present application is smaller than the first capability parameter.

In one embodiment, a number of serving cells comprised in the scheduled cell set in the present application is larger than the first capability parameter.

In one embodiment, a number of serving cells comprised in the scheduled cell set in the present application is equal to the first capability parameter.

In one embodiment, a number of serving cells comprised in the scheduled cell set in the present application is smaller than the first capability parameter.

In one embodiment, a sum of a product of the second number in the present application and the first factor in the present application added by the first number in the present application is larger than the first capability parameter.

In one embodiment, a sum of a product of the second number in the present application and the first factor in the present application added by the first number in the present application is equal to the first capability parameter.

In one embodiment, a sum of a product of the second number in the present application and the first factor in the present application added by the first number in the present application is smaller than the first capability parameter.

Embodiment 7

Figure 7:
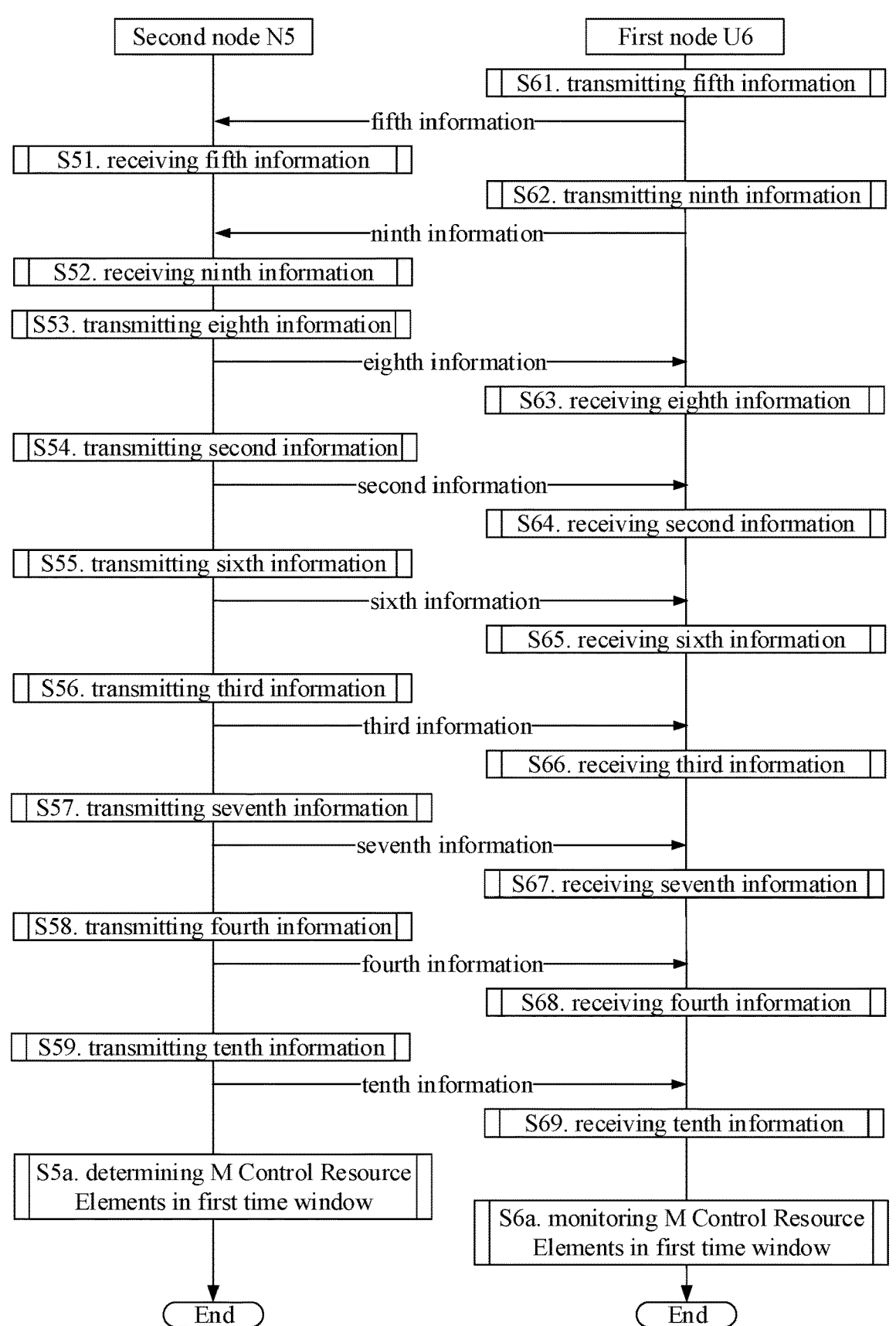
FIG. 7 illustrates a flowchart of radio signal transmission according to another embodiment of the present application.

Embodiment 7 illustrates a flowchart of signal transmission according to another embodiment of the present application, as shown in FIG. 7. In FIG. 7, a second node N5 is a maintenance base station for a serving cell of a first node U6. It should be particularly noted that the sequence illustrated herein does not set any limit to the signal transmission order or implementation order in the present application.

The second node N5 receives fifth information in step S51, receives ninth information in step S52, and transmits eighth information in step S53, transmits second information in step S54, transmits sixth information in step S55, and transmits third information in step S56, transmits seventh information in step S57, and transmits fourth information in step S58, transmits tenth information in step S59, and determines M Control Resource Elements in a first time window in step S5a.

The first node U6 transmits fifth information in step S61, transmits ninth information in step S62, and receives eighth information in step S63, receives second information in step S64, receives sixth information in step S65, receives third information in step S66, and receives seventh information in step S67, receives fourth information in step S68, receives tenth information in step S69, and monitors M Control Resource Elements in a first time window in step S6a.

In one embodiment, the sixth information is used to determine each sub-band in the first sub-band set and a subcarrier spacing of subcarriers comprised in each sub-band in the first sub-band set.

In one embodiment, the seventh information is used to determine time-frequency resources occupied by each Control Resource Element among the M Control Resource Elements.

In one embodiment, the seventh information is used to determine Q Control Resource Elements, any Control Resource Element among the M Control Resource Elements is one of the Q Control Resource Elements, where Q is a positive integer no less than the M; M is equal to the first threshold, the first threshold being used to determine the M Control Resource Elements from the Q Control Resource Elements.

In one embodiment, the seventh information is used to determine a sub-band in the first sub-band set to which time-frequency resources occupied by each Control Resource Element among the M Control Resource Elements belong.

In one embodiment, the eighth information is used to determine the first factor in the present application.

In one embodiment, the ninth information is used to indicate the first factor in the present application.

In one embodiment, the tenth information is used to indicate a difference between the second characteristic sum value and the first characteristic sum value in the present application.

Embodiment 8

Embodiment 8 illustrates a schematic diagram of a relationship between a first Control Resource Element and a second Control Resource Element according to one embodiment of the present application, as shown in FIG. 8. In FIG. 8, as shown in Case A and Case B, the horizontal axis represents time while the vertical axis represents frequency. Each rectangle represents one of M Control Resource Elements, where the rectangle filled with reticles represents a first Control Resource Element while the rectangle filled with crosses represents a second Control Resource Element; as illustrated in Case A, Control Resource Elements included by dotted-line frame belong to a same Control Resource Set.

In Embodiment 8, a first Control Resource Element is one of the M Control Resource Elements in the present application, and a second Control Resource Element is one of the M Control Resource Elements other than the first Control Resource Element in the present application; the first Control Resource Element and the second Control Resource Element respectively belong to different Control Resource Sets, or control channel candidates respectively occupying the first Control Resource Element and the second Control Resource Element occupy different starting symbols in time domain.

In one embodiment, time-frequency resources occupied by the first Control Resource Element are different from those occupied by the second Control Resource Element.

In one embodiment, time-frequency resources occupied by the first Control Resource Element are the same as those occupied by the second Control Resource Element.

In one embodiment, the first Control Resource Element and the second Control Resource Element are Non-Overlapped.

In one embodiment, the phrase that "the first Control Resource Element and the second Control Resource Element respectively belong to different Control Resource Sets" comprises a meaning that the first Control Resource Element belongs to a first Control Resource Set, while the second Control Resource Element belongs to a second Control Resource Element belongs to a second Control Resource Set; the first Control Resource Set is a CORESET, and the second Control Resource Set is a CORESET, the first Control Resource Set and the second Control Resource Set being different.

In one embodiment, the phrase that "the first Control Resource Element and the second Control Resource Element respectively belong to different Control Resource Sets" comprises a meaning that the first Control Resource Element and the second Control Resource Element respectively belong to different CORESETs configured with different indexes.

In one embodiment, the phrase that "the first Control Resource Element and the second Control Resource Element respectively belong to different Control Resource Sets" comprises a meaning that the first Control Resource Element belongs to a first Control Resource Set, while the second Control Resource Element belongs to a second Control Resource Set; the first Control Resource Set is a CORESET, and the second Control Resource Set is a CORESET, the first Control Resource Set and the second Control Resource Set comprising different time-frequency resources.

In one embodiment, the phrase that "the first Control Resource Element and the second Control Resource Element respectively belong to different Control Resource Sets" comprises a meaning that the first Control Resource Element belongs to a first Control Resource Set, while the second Control Resource Element belongs to a second Control Resource Set; the first Control Resource Set is a CORESET, and the second Control Resource Set is a CORESET, where an index of the first Control Resource Set and an index of the second Control Resource Set are different.

In one embodiment, the phrase that "the first Control Resource Element and the second Control Resource Element respectively belong to different Control Resource Sets" comprises a meaning that the first Control Resource Element belongs to a first Control Resource Set, while the second Control Resource Element belongs to a second Control Resource Set; the first Control Resource Set is a CORESET, and the second Control Resource Set is a CORESET, where time-frequency resources occupied by the first Control Resource Set and time-frequency resources occupied by the second Control Resource Set are the same, while an index of the first Control Resource Set and an index of the second Control Resource Set are different.

In one embodiment, the phrase that "control channel candidates respectively occupying the first Control Resource Element and the second Control Resource Element occupy different starting symbols in time domain" comprises a meaning that a first control channel candidate occupies the first Control Resource Element, while a second control channel candidate occupies the second Control Resource Element, a Starting Symbol/First Symbol occupied by the first control channel candidate in time domain being different from that occupied by the second control channel candidate in time domain.

In one embodiment, the phrase that "control channel candidates respectively occupying the first Control Resource Element and the second Control Resource Element occupy different starting symbols in time domain" comprises a meaning that control channel candidates respectively occupying the first Control Resource Element and the second Control Resource Element occupy different time-domain resources.

In one embodiment, the phrase that "control channel candidates respectively occupying the first Control Resource Element and the second Control Resource Element occupy different starting symbols in time domain" comprises a meaning that Starting Symbols/First Symbols respectively occupied by control channel candidates respectively occupying the first Control Resource Element and the second Control Resource Element have different indexes in the first time window.

In one embodiment, the phrase that "control channel candidates respectively occupying the first Control Resource Element and the second Control Resource Element occupy different starting symbols in time domain" comprises a meaning that Starting Symbols/First Symbols respectively occupied by control channel candidates respectively occupying the first Control Resource Element and the second Control Resource Element have different indexes in slots the said Symbols respectively belong to.

In one embodiment, a Starting Symbol/First Symbol of a control channel candidate occupying the first Control Resource Element is an OFDM symbol, and a Starting Symbol/First Symbol of a control channel candidate occupying the second Control Resource Element is an OFDM symbol.

Embodiment 9

Embodiment 9 illustrates a schematic diagram of a relationship between a scheduling cell set and a scheduled cell set according to one embodiment of the present application, as shown in FIG. 9. In FIG. 9, the horizontal axis represents frequency, each filled block with an arc top represents a serving cell comprised in a configured cell group, each said block filled with slashes represents a serving cell comprised in a scheduling cell set while each said block filled with back-slashes represents a serving cell comprised in a scheduled cell set, each said block filled with crosses represents a serving cell belonging to both the scheduling cell set and the scheduled cell set, a dotted-line curve with an arrowhead denotes the relation of a serving cell which schedules and a serving cell being scheduled.

In Embodiment 9, the configured cell group in the present application comprises multiple serving cells; the target cell in the present application belongs to the configured cell group, and the characteristic cell in the present application belongs to the configured cell group, with the characteristic cell being a primary cell in the configured cell group; a scheduled cell set comprises serving cell(s) scheduled by the serving cell(s) comprised in the scheduling cell set in the present application, the scheduled cell set comprising a positive integer number of serving cell(s); any serving cell comprised in the scheduling cell set belongs to the configured cell group, while any serving cell comprised in the scheduled cell set belongs to the configured cell group.

In one embodiment, the configured cell group is a Master Cell Group (MCG).

In one embodiment, the configured cell group is a Secondary Cell Group (SCG).

In one embodiment, the configured cell group comprises a MAC entity, a set of logical channels associated with RLC entities and a set comprising a Primary Cell (Pcell) and one or more Secondary Cells (Scells).

In one embodiment, the target cell is a Primary Cell (Pcell) comprised in the configured cell group.

In one embodiment, the target cell is a Special Cell (Spcell) comprised in the configured cell group.

In one embodiment, the target cell is a Secondary Cell (Scell) comprised in the configured cell group.

In one embodiment, the phrase of "the characteristic cell being a primary cell in the configured cell group" comprises a meaning that when the configured cell group is an MCG, the characteristic cell is a Primary Cell (Pcell) in the configured cell group; when the configured cell group is an SCG, the characteristic cell is a Primary SCG Cell (PSCell) in the configured cell group.

In one embodiment, the phrase of "the characteristic cell being a primary cell in the configured cell group" comprises a meaning that the characteristic cell is a Special Cell (Spcell) comprised in the configured cell group.

In one embodiment, the phrase of "the characteristic cell being a primary cell in the configured cell group" comprises a meaning that the characteristic cell is a serving cell comprised in the configured cell group to be used by the first node in the present application to perform either an initial connection establishment procedure or a connection re-establishment procedure.

In one embodiment, the phrase of "the characteristic cell being a primary cell in the configured cell group" comprises a meaning that the characteristic cell is a serving cell comprised in the configured cell group to be used by the first node in the present application for Random Access in performing a Reconfiguration with Sync procedure.

In one embodiment, the phrase that "a scheduled cell set comprises serving cell(s) scheduled by the serving cell(s) comprised in the scheduling cell set" comprises a meaning that the scheduled cell set comprises all serving cell(s) scheduled by any serving cell comprised in the scheduling cell set.

In one embodiment, the phrase that "a scheduled cell set comprises serving cell(s) scheduled by the serving cell(s) comprised in the scheduling cell set" comprises a meaning that the scheduled cell set only comprises serving cell(s) scheduled by each serving cell comprised in the scheduling cell set.

In one embodiment, the phrase that "a scheduled cell set comprises serving cell(s) scheduled by the serving cell(s) comprised in the scheduling cell set" comprises a meaning that any serving cell scheduled by a serving cell comprised in the scheduling cell set belongs to the scheduled cell set.

In one embodiment, the phrase that "a scheduled cell set comprises serving cell(s) scheduled by the serving cell(s) comprised in the scheduling cell set" comprises a meaning that any serving cell scheduled by a serving cell comprised in the scheduling cell set is a component of the scheduled cell set.

In one embodiment, the phrase that "a scheduled cell set comprises serving cell(s) scheduled by the serving cell(s) comprised in the scheduling cell set" comprises a meaning that the scheduling cell set comprises a cell scheduling any serving cell comprised in the scheduled cell set.

In one embodiment, when the scheduling cell set comprises the target cell, the scheduled cell set comprises the characteristic cell.

In one embodiment, when the target cell belongs to the scheduling cell set, the characteristic cell belongs to the scheduled cell set.

Embodiment 10

Embodiment 10 illustrates a schematic diagram of a target proportional value according to one embodiment of the present application, as shown in FIG. 10. In FIG. 10, three rectangular boxes respectively represent a first proportional value, a second proportional value and a target proportional value, with an arrow indicating the procedure of calculation.

In Embodiment 10, a target proportional value is used to determine the first threshold in the present application, the target proportional value being a positive number no greater than 1; the target proportional value is equal to either a first proportional value or a second proportional value; the first proportional value is equal to a ratio of a first sum value to a first characteristic sum value, while the second proportional value is equal to a ratio of a second sum value to a second characteristic sum value; the first sum value is a positive number, the first characteristic sum value is a positive number no less than the first sum value, while the second sum value is a positive number, the second characteristic sum value is a positive number no less than the second sum value, where the first proportional value and the second proportional value are unequal; at least one of whether the scheduling cell set in the present application comprises the target cell in the present application or whether the characteristic cell and the target cell in the present application are the same is used to determine the target proportional value from the first proportional value and the second proportional value.

In one embodiment, the first proportional value can be equal to 1.

In one embodiment, the first proportional value is greater than 0.

In one embodiment, the first proportional value is less than 1.

In one embodiment, the second proportional value can be equal to 1.

In one embodiment, the second proportional value is greater than 0.

In one embodiment, the second proportional value is less than 1.

In one embodiment, the phrase that "a target proportional value is used to determine the first threshold" comprises a meaning that the target value in the present application is directly proportional to the target proportional value.

In one embodiment, the phrase that "a target proportional value is used to determine the first threshold" comprises the meaning that the target proportional value is used by the first node in the present application to determine the first threshold.

In one embodiment, the phrase that "a target proportional value is used to determine the first threshold" comprises a meaning that the first threshold is directly proportional to the target proportional value.

In one embodiment, the phrase that "a target proportional value is used to determine the first threshold" comprises the meaning that the target proportional value is calculated by an operating function to obtain the first threshold.

In one embodiment, the phrase that "a target proportional value is used to determine the first threshold" comprises the meaning that the target proportional value is used to determine an intermediate value, and the first threshold is a value of the intermediate value being rounded down to a nearest integer.

In one embodiment, the phrase that "a target proportional value is used to determine the first threshold" comprises a meaning that the target proportional value in the present application is used to determine the target value in the present application.

In one embodiment, the phrase that "the target proportional value is equal to either a first proportional value or a second proportional value" comprises a meaning that the target proportional value is equal to the first proportional value, or the target proportional value is equal to the second proportional value.

In one embodiment, the phrase that "the target proportional value is equal to either a first proportional value or a second proportional value" comprises a meaning that the target proportional value may be equal to the first proportional value, or the target proportional value may be equal to the second proportional value.

In one embodiment, the first sum value is equal to the second sum value.

In one embodiment, the first sum value is unequal to the second sum value.

In one embodiment, the first characteristic sum value is equal to the second characteristic sum value.

In one embodiment, the first characteristic sum value is unequal to the second characteristic sum value.

In one embodiment, the first characteristic sum value is greater than the first sum value.

In one embodiment, the first characteristic sum value is equal to the first sum value.

In one embodiment, the second characteristic sum value is greater than the second sum value.

In one embodiment, the second characteristic sum value is equal to the second sum value.

In one embodiment, the first proportional value is greater than the second proportional value.

In one embodiment, the first proportional value is less than the second proportional value.

In one embodiment, the phrase that "at least one of whether the scheduling cell set comprises the target cell or whether the characteristic cell and the target cell are the same is used to determine the target proportional value between the first proportional value and the second proportional value" means that whether the scheduling cell set comprises the target cell and whether the characteristic cell is the same as the target cell are used together to determine the target proportional value between the first proportional value and the second proportional value.

In one embodiment, the phrase that "at least one of whether the scheduling cell set comprises the target cell or whether the characteristic cell and the target cell are the same is used to determine the target proportional value between the first proportional value and the second proportional value" means that whether the scheduling cell set comprises the target cell is used to determine the target proportional value between the first proportional value and the second proportional value.

In one embodiment, the phrase that "at least one of whether the scheduling cell set comprises the target cell or whether the characteristic cell and the target cell are the same is used to determine the target proportional value between the first proportional value and the second proportional value" means that whether the characteristic cell is the same as the target cell is used to determine the target proportional value between the first proportional value and the second proportional value.

In one embodiment, the phrase that "at least one of whether the scheduling cell set comprises the target cell or whether the characteristic cell and the target cell are the same is used to determine the target proportional value between the first proportional value and the second proportional value" means that at least one of whether the scheduling cell set comprises the target cell or whether the characteristic cell is the same as the target cell is used by the first node in the present application to determine the target proportional value between the first proportional value and the second proportional value.

In one embodiment, the phrase that "at least one of whether the scheduling cell set comprises the target cell or whether the characteristic cell and the target cell are the same is used to determine the target proportional value between the first proportional value and the second proportional value" means that at least one of whether the scheduling cell set comprises the target cell or whether the characteristic cell is the same as the target cell is used to determine the target proportional value between the first proportional value and the second proportional value according to conditions of decision.

In one embodiment, the phrase that "at least one of whether the scheduling cell set comprises the target cell or whether the characteristic cell and the target cell are the same is used to determine the target proportional value between the first proportional value and the second proportional value" means that when the characteristic cell and the target cell are the same, the target proportional value is equal to the first proportional value; when the characteristic cell and the target cell are different and the scheduling cell set does not comprise the target cell, the target proportional value is equal to the first proportional value; when the characteristic cell and the target cell are different and the scheduling cell set comprises the target cell, the target proportional value is equal to the second proportional value.

In one embodiment, the phrase that "at least one of whether the scheduling cell set comprises the target cell or whether the characteristic cell and the target cell are the same is used to determine the target proportional value between the first proportional value and the second proportional value" means that when the characteristic cell and the target cell are the same, the target proportional value is equal to the first proportional value; when the characteristic cell and the target cell are different, the target proportional value is equal to the second proportional value.

In one embodiment, the phrase that "at least one of whether the scheduling cell set comprises the target cell or whether the characteristic cell and the target cell are the same is used to determine the target proportional value between the first proportional value and the second proportional value" means that when the scheduling cell set does not comprise the target cell, the target proportional value is equal to the first proportional value; when the scheduling cell set comprises the target cell, the target proportional value is equal to the second proportional value.

In one embodiment, the phrase that "at least one of whether the scheduling cell set comprises the target cell or whether the characteristic cell and the target cell are the same is used to determine the target proportional value between the first proportional value and the second proportional value" means that at least one of whether the scheduling cell set comprises the target cell or whether the characteristic cell is the same as the target cell is used to determine whether the first sum value and the second sum value are equal.

In one embodiment, the phrase that "at least one of whether the scheduling cell set comprises the target cell or whether the characteristic cell and the target cell are the same is used to determine the target proportional value between the first proportional value and the second proportional value" means that at least one of whether the scheduling cell set comprises the target cell or whether the characteristic cell is the same as the target cell is used to determine whether the first characteristic sum value and the second characteristic sum value are equal.

In one embodiment, when the characteristic cell and the target cell are different, the first characteristic sum value is unequal to the second characteristic sum value.

In one embodiment, when the scheduling cell set comprises the target cell, the first sum value is unequal to the second sum value.

In one embodiment, a number of serving cells comprised in the configured cell group is equal to a number of serving cells comprised in the scheduled cell set.

In one embodiment, a number of serving cells comprised in the configured cell group is unequal to a number of serving cells comprised in the scheduled cell set.

In one embodiment, a number of serving cells comprised in the configured cell group is greater than a number of serving cells comprised in the scheduled cell set.

In one embodiment, the first characteristic sum value is equal to a number of serving cells comprised in the configured cell group; the first characteristic sum value is equal to a number of serving cells comprised in the scheduled cell set.

Embodiment 11

Figures 11, 12, 13, 14, 15:
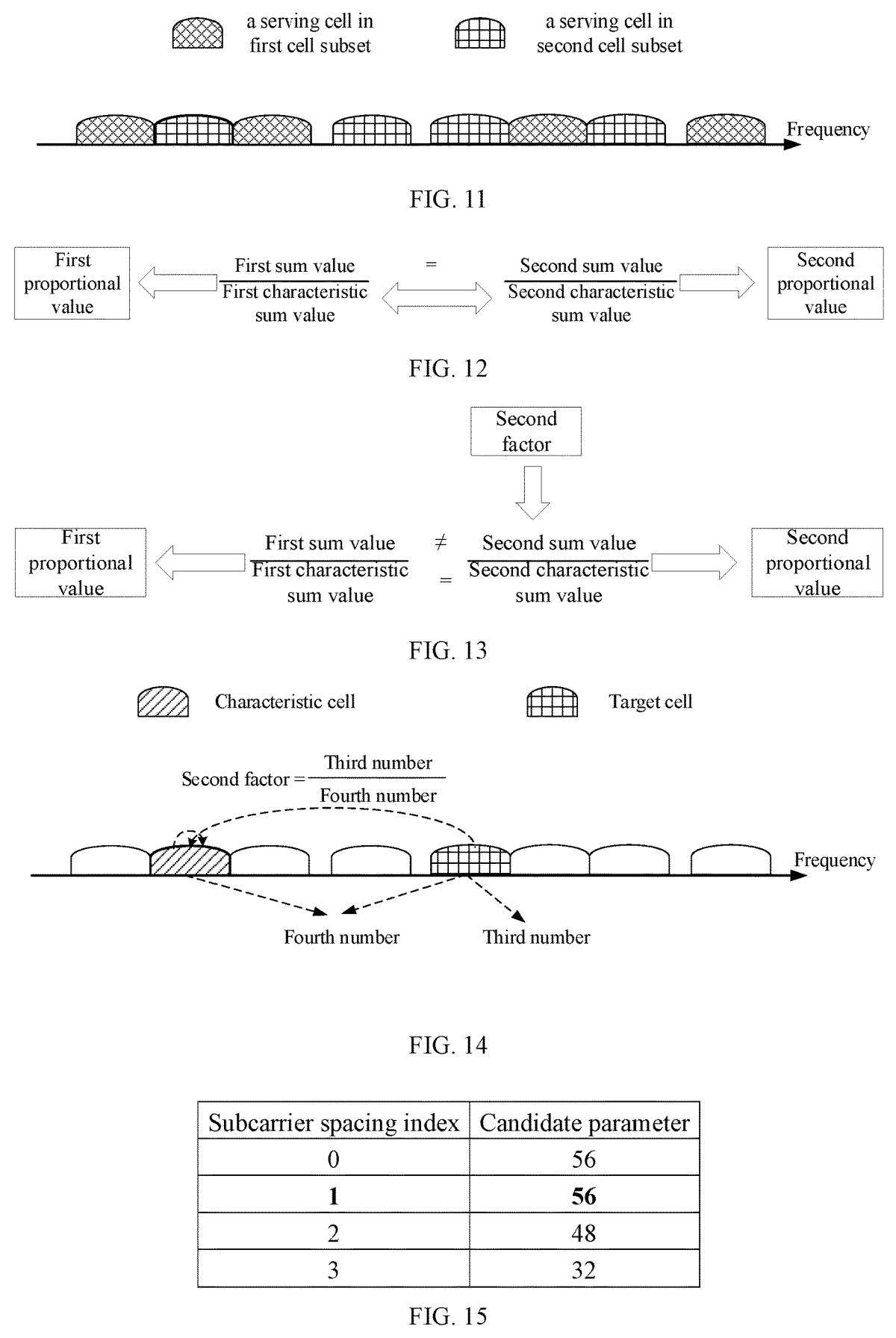

Embodiment 11 illustrates a schematic diagram of a relationship between a first cell subset and a second cell subset according to one embodiment of the present application, as shown in FIG. 11. In FIG. 11, the horizontal axis represents frequency, each filled block with an arc top represents a serving cell, where each said block filled with crosses represents a serving cell in a first cell subset, and each said block filled with reticles represents a serving cell in a second cell subset.

In Embodiment 11, the third information in the present application is used to determine a first cell subset and a second cell subset, the first cell subset comprising a positive integer number of serving cell(s), and the second cell subset comprising a positive integer number of serving cell(s); a number of serving cell(s) belonging to the first cell subset comprised in the scheduled cell set in the present application is equal to a first number, while a number of serving cell(s) belonging to the second cell subset comprised in the scheduled cell set in the present application is equal to a second number; the first characteristic sum value in the present application is linear with a product of a number of serving cell(s) comprised in the second cell subset and a first factor, and the first characteristic sum value in the present application is linear with a number of serving cell(s) comprised in the first cell subset; the first sum value in the present application is linear with a product of the second number and the first factor, and the first sum value in the present application is linear with the first number; the first factor is configurable, or the first factor is pre-defined.

In one embodiment, none of serving cell(s) comprised in the first cell subset is provided a CORESET Pool Index.

In one embodiment, each of serving cell(s) comprised in the first cell subset is only provided one CORESET Pool Index.

In one embodiment, the first node in the present application is only provided one CORESET Pool Index for all CORESETs on all BWPs per serving cell comprised in the first cell subset.

In one embodiment, the first node in the present application is only provided one CORESET per BWP per serving cell comprised in the first cell subset.

In one embodiment, the first node in the present application is provided more than one CORESET on any BWP per serving cell comprised in the second cell subset.

In one embodiment, the first node in the present application is provided more than one CORESET Pool Index on any BWP per serving cell comprised in the second cell subset.

In one embodiment, the first node in the present application is provided two CORESETs on any BWP per serving cell comprised in the second cell subset.

In one embodiment, the first node in the present application is provided two CORESET Pool Indexes on any BWP per serving cell comprised in the second cell subset.

In one embodiment, on any BWP per serving cell comprised in the second cell subset, a CORESET Pool Index provided to a CORESET by the first node in the present application is equal to a value of 0, and a CORESET Pool Index provided to another CORESET by the first node in the present application is equal to a value of 1.

In one embodiment, on any BWP per serving cell comprised in the second cell subset, a CORESET Pool Index provided to a first CORESET by the first node in the present application is equal to a value of 0, and a CORESET Pool Index provided to a second CORESET by the first node in the present application is equal to a value of 1, where the first CORESET and the second CORESET are different.

In one embodiment, the first number is a non-negative integer.

In one embodiment, the second number is a non-negative integer.

In one embodiment, the first number can be equal to 0.

In one embodiment, the second number can be equal to 0.

In one embodiment, the first number is greater than 0.

In one embodiment, the second number is greater than 0.

In one embodiment, any serving cell comprised in the scheduled cell set belongs to either of the first cell subset and the second cell subset.

In one embodiment, any serving cell comprised in the scheduled cell set either belongs to the first cell subset or to the second cell subset.

In one embodiment, the scheduled cell set comprises one serving cell that neither belongs to the first cell subset nor to the second cell subset.

In one embodiment, the first factor is equal to 1.

In one embodiment, the first factor is unequal to 1.

In one embodiment, the phrase that "the first factor is configurable" means that the first factor is configured by the second node in the present application.

In one embodiment, the phrase that "the first factor is configurable" means that the first factor is reported by the first node in the present application.

In one embodiment, the phrase that "the first factor is configurable" means that the first processor also receives eighth information, where the eighth information is used for indicating the first factor.

In one embodiment, the phrase that "the first factor is configurable" means that the first processor also transmits ninth information, where the ninth information is used for indicating the first factor.

In one embodiment, the phrase that "the first factor is pre-defined" means that the first factor is equal to a fixed value.

In one embodiment, the phrase that "the first factor is pre-defined" means that the first factor is equal to 1.

In one embodiment, the phrase that "the first factor is pre-defined" means that the first factor is equal to a default value.

In one embodiment, the first factor is a Blind Decoding (BD) Factor.

In one embodiment, the first factor is used to determine the possible magnification and minification of scaling a number of Blind Decodings.

In one embodiment, any serving cell comprised in the first cell subset belongs to the configured cell group, and any serving cell comprised in the second cell subset belongs to the configured cell group.

In one embodiment, the phrase that "the first characteristic sum value is linear with a product of a number of serving cell(s) comprised in the second cell subset and a first factor, and the first characteristic sum value is linear with a number of serving cell(s) comprised in the first cell subset" is implemented through the following formula:

$$\text{Sum}_1 = N_{cells,0}^{DL} + \gamma \cdot N_{cells,1}^{DL}$$

herein, $\text{Sum}_1$ represents the first characteristic sum value, $N_{cells,0}^{DL}$ represents a number of serving cell(s) comprised in the first cell subset, $$N_{cells,1}^{DL}$$

represents a number of serving cell(s) comprised in the second cell subset, $\gamma$ represents the first factor.

In one embodiment, the phrase that "the first characteristic sum value is linear with a product of a number of serving cell(s) comprised in the second cell subset and a first factor, and the first characteristic sum value is linear with a number of serving cell(s) comprised in the first cell subset" is implemented through the following formula:

$$\mathrm{Sum}_1 = \sum\nolimits_{j=0} \left( N_{cells,0}^{DL,j} + \gamma \cdot N_{cells,1}^{DL,j} \right)$$

herein, $\mathrm{Sum}_1$ represents the first characteristic sum value, $$N_{cells,0}^{DL,j}$$

represents a number of serving cell(s) configured with Numerology index of j comprised in the first cell subset, $$\sum\nolimits_{j=0} N_{cells,0}^{DL,j}$$

represents a number of serving cell(s) comprised in the first cell subset, $$N_{cells,1}^{DL,j}$$

represents a number of serving cell(s) configured with Numerology index of j comprised in the second cell subset, $$N_{cells,1}^{DL,j}$$

represents a number of serving cell(s) comprised in the second cell subset, $\gamma$ represents the first factor.

In one embodiment, the phrase that "the first characteristic sum value is linear with a product of a number of serving cell(s) comprised in the second cell subset and a first factor, and the first characteristic sum value is linear with a number of serving cell(s) comprised in the first cell subset" comprises a meaning that the first characteristic sum value is a sum of a product of a number of serving cell(s) comprised in the second cell subset and a first factor added with a number of serving cell(s) comprised in the first cell subset.

In one embodiment, the phrase that "the first characteristic sum value is linear with a product of a number of serving cell(s) comprised in the second cell subset and a first factor, and the first characteristic sum value is linear with a number of serving cell(s) comprised in the first cell subset" comprises a meaning that the first characteristic sum value is positively linear with a product of a number of serving cell(s) comprised in the second cell subset and a first factor and is positively linear with a number of serving cell(s) comprised in the first cell subset.

In one embodiment, the phrase that "the first sum value is linear with a product of the second number and the first factor, and the first sum value is linear with the first number" comprises a meaning that the first sum value is equal to a sum of a product of the second number and the first factor added with the first number.

In one embodiment, the phrase that "the first sum value is linear with a product of the second number and the first factor, and the first sum value is linear with the first number" comprises a meaning that the first sum value is positively linear with a product of the second number and the first factor and is positively linear with the first number.

In one embodiment, the phrase that "the first sum value is linear with a product of the second number and the first factor, and the first sum value is linear with the first number" is implemented through the following formula:

$$\Omega_1 = N_{cells,0}^{DL,\mu} + \gamma \cdot N_{cells,1}^{DL,\mu}$$

herein, $\Omega_1$ represents the first sum value, $$N_{cells,0}^{DL,\mu}$$

represents the first number, $$N_{cells,1}^{DL,\mu}$$

represents the second number, and $\gamma$ represents the first factor.

Embodiment 12

Embodiment 12 illustrates a schematic diagram of a relationship between a first characteristic sum value and a second characteristic sum value according to one embodiment of the present application, as shown in FIG. 12. In FIG. 12, two rectangular boxes respectively represent a first proportional value and a second proportional value, with an arrow indicating the procedure of calculation.

In Embodiment 12, the second sum value in the present application and the first sum value in the present application are equal, while the first characteristic sum value in the present application and the second characteristic sum value in the present application are unequal; a difference between the second characteristic sum value and the first characteristic sum value is pre-defined, or a difference between the second characteristic sum value and the first characteristic sum value is configurable.

In one embodiment, the phrase that "a difference between the second characteristic sum value and the first characteristic sum value is pre-defined, or a difference between the second characteristic sum value and the first characteristic sum value is configurable" comprises a meaning that a difference between the second characteristic sum value and the first characteristic sum value is pre-defined.

In one embodiment, the phrase that "a difference between the second characteristic sum value and the first characteristic sum value is pre-defined, or a difference between the second characteristic sum value and the first characteristic sum value is configurable" comprises a meaning that a difference between the second characteristic sum value and the first characteristic sum value is configurable.

In one embodiment, the phrase that "a difference between the second characteristic sum value and the first characteristic sum value is pre-defined, or a difference between the second characteristic sum value and the first characteristic sum value is configurable" comprises a meaning that in some cases, a difference between the second characteristic sum value and the first characteristic sum value is pre-defined, or, in other cases, a difference between the second characteristic sum value and the first characteristic sum value is configurable.

In one embodiment, the phrase that "a difference between the second characteristic sum value and the first characteristic sum value is pre-defined" comprises a meaning that a difference between the second characteristic sum value and the first characteristic sum value is fixed.

In one embodiment, the phrase that "a difference between the second characteristic sum value and the first characteristic sum value is pre-defined" comprises a meaning that a difference between the second characteristic sum value and the first characteristic sum value is Hard Coded in the standard protocol.

In one embodiment, the phrase that "a difference between the second characteristic sum value and the first characteristic sum value is pre-defined" comprises a meaning that a difference between the second characteristic sum value and the first characteristic sum value is equal to 1.

In one embodiment, the phrase that "a difference between the second characteristic sum value and the first characteristic sum value is pre-defined" comprises a meaning that the second characteristic sum value is greater than the first characteristic sum value by 1.

In one embodiment, the phrase that "a difference between the second characteristic sum value and the first characteristic sum value is pre-defined" comprises a meaning that a difference between the second characteristic sum value and the first characteristic sum value is equal to a default value.

In one embodiment, the phrase that "a difference between the second characteristic sum value and the first characteristic sum value is configurable" comprises a meaning that a difference between the second characteristic sum value and the first characteristic sum value is configured by the second node in the present application.

In one embodiment, the phrase that "a difference between the second characteristic sum value and the first characteristic sum value is configurable" comprises a meaning that a difference between the second characteristic sum value and the first characteristic sum value is reported by the first node in the present application.

In one embodiment, the phrase that "a difference between the second characteristic sum value and the first characteristic sum value is configurable" comprises a meaning that the first processor in the present application receives tenth information, where the tenth information is used to indicate a difference between the second characteristic sum value and the first characteristic sum value.

In one embodiment, the phrase that "a difference between the second characteristic sum value and the first characteristic sum value is configurable" comprises a meaning that the first processor in the present application transmits eleventh information, where the eleventh information is used to indicate a difference between the second characteristic sum value and the first characteristic sum value.

Embodiment 13

Embodiment 13 illustrates a schematic diagram of a relation between a second factor and a second sum value according to one embodiment of the present application, as shown in FIG. 13. In FIG. 13, three rectangular boxes respectively represent a first proportional value, a second proportional value and a second factor, with an arrow indicating the procedure of calculation.

In Embodiment 13, the fourth information is used to determine a second factor, the second factor being a positive number less than 1, the second factor is used to determine the second sum value in the present application, the second sum value in the present application being unequal to the first sum value in the present application, the second characteristic sum value in the present application being equal to the first characteristic sum value in the present application.

In one embodiment, the phrase that "the second factor is used to determine the second sum value" comprises the meaning that the second factor is used by the first node in the present application to determine the second sum value.

In one embodiment, the phrase that "the second factor is used to determine the second sum value" comprises the meaning that the second factor is used to calculate the second sum value.

In one embodiment, the phrase that "the second factor is used to determine the second sum value" comprises the meaning that when the first cell subset in the present application comprises the characteristic cell, the second sum value is equal to a difference between the first sum value and the second factor; when the second cell subset in the present application comprises the characteristic cell, the second sum value is equal to a difference between the first sum value and a product of the first factor and the second factor in the present application.

In one embodiment, the phrase that "the second factor is used to determine the second sum value" is implemented by means of the following:

when the first cell subset in the present application comprises the characteristic cell, $$\Omega_2 = \Omega_1 - \vartheta$$

when the second cell subset in the present application comprises the characteristic cell, $$\Omega_2 = \Omega_1 - \gamma \cdot \vartheta$$

herein, $\Omega_2$ represents the second sum value, $\Omega_1$ represents the first sum value, $\gamma$ represents the first factor, and $\vartheta$ represents the second factor.

In one embodiment, the phrase that "the second factor is used to determine the second sum value" comprises the meaning that the second sum value is equal to a difference between the first sum value and the second factor.

Embodiment 14

Embodiment 14 illustrates a schematic diagram of a second factor according to one embodiment of the present application, as shown in FIG. 14. In FIG. 14, the horizontal axis represents frequency, each filled block with an arc top represents a serving cell, the said block filled with slashes represents a characteristic cell, the said block filled with reticles represents a target cell, a dotted-line curve with an arrowhead denotes the relation of a serving cell which schedules and a serving cell being scheduled.

In Embodiment 14, the fourth information is used to determine a first candidate set and a second candidate set, the first candidate set comprising a positive integer number of control channel candidate(s), the second candidate set comprising a positive integer number of control channel candidate(s); each control channel candidate comprised in the first candidate set is a control channel candidate used for scheduling the characteristic cell of the present application on the target cell in the present application, while each control channel candidate comprised in the second candidate set is a control channel candidate used for scheduling the characteristic cell of the present application; a number of non-overlapped control resource elements occupied by control channel candidate(s) comprised in the first candidate set is equal to a third number, while a number of non-overlapped control resource elements occupied by control channel candidate(s) comprised in the second candidate set is equal to a fourth number; the second factor in the present application is linear with a ratio of the third number to the fourth number.

In one embodiment, the phrase that "the fourth information is used to determine a first candidate set and a second candidate set" comprises the meaning that the fourth information is used by the first node in the present application to determine the first candidate set and the second candidate set.

In one embodiment, the phrase that "the fourth information is used to determine a first candidate set and a second candidate set" comprises the meaning that the fourth information is used for explicitly indicating the first candidate set and the second candidate set.

In one embodiment, the phrase that "the fourth information is used to determine a first candidate set and a second candidate set" comprises the meaning that the fourth information is used for implicitly indicating the first candidate set and the second candidate set.

In one embodiment, the phrase that "the fourth information is used to determine a first candidate set and a second candidate set" comprises the meaning that the fourth information is used for indirectly indicating the first candidate set and the second candidate set.

In one embodiment, the phrase that "the fourth information is used to determine a first candidate set and a second candidate set" comprises the meaning that the fourth information comprises Y sub-information-blocks, Y being a positive integer greater than 1, the Y sub-information-blocks are respectively used to indicate Y candidate sets, the first candidate set is a subset of one of the Y candidate sets, while the second candidate set consists of control channel candidates used for scheduling the characteristic cell comprised in Y1 candidate set(s) of the Y candidate sets, Y1 being a positive integer no greater than Y.

In one embodiment, the fourth information comprises an IE "PDCCH-Config" used for scheduling the characteristic cell.

In one embodiment, the fourth information comprises a field "searchSpace" in an IE "PDCCH-Config" used for scheduling the characteristic cell.

In one embodiment, the fourth information is used to determine each Aggregation Level (AL) control channel candidate used for scheduling the characteristic cell in the target cell, the first candidate set comprising each Aggregation Level (AL) control channel candidate used for scheduling the characteristic cell in the target cell.

In one embodiment, the phrase that "the fourth information is used to determine a first candidate set and a second candidate set" comprises the meaning that the fourth information comprises Y sub-information-blocks, Y being a positive integer greater than 1, the Y sub-information-blocks are respectively used to indicate Y candidate sets, the first candidate set consists of control channel candidates used for scheduling the characteristic cell in a candidate set for the target cell among the Y candidate sets, while the second candidate set consists of control channel candidates used for scheduling the characteristic cell comprised in Y1 candidate set(s) of the Y candidate sets, Y1 being a positive integer no greater than Y.

In one embodiment, the first candidate set only comprises one control channel candidate.

In one embodiment, the first candidate set comprises multiple control channel candidates.

In one embodiment, any control channel candidate comprised in the first candidate set occupies a positive integer number of Control Channel Element(s) (CCE).

In one embodiment, the first candidate set comprises one or more control channel candidates occupying at least one of the M Control Resource Elements.

In one embodiment, each control channel candidate comprised in the first candidate set belongs to the second candidate set.

In one embodiment, the second candidate set comprises a control channel candidate other than the first candidate set.

In one embodiment, the second candidate set comprises any control channel candidate in the first candidate set.

In one embodiment, a number of control channel candidates comprised in the second candidate set is greater than a number of control channel candidates comprised in the first candidate set.

In one embodiment, the second candidate set only comprises one control channel candidate.

In one embodiment, the second candidate set comprises multiple control channel candidates.

In one embodiment, any control channel candidate comprised in the second candidate set occupies a positive integer number of Control Channel Element(s) (CCE).

In one embodiment, the second candidate set comprises one or more control channel candidates occupying at least one of the M Control Resource Elements.

In one embodiment, the second candidate set comprises one control channel candidate only occupying Control Resource Element(s) other than the M Control Resource Elements.

In one embodiment, any control channel candidate comprised in the first candidate set occupies time-frequency resources in time-frequency domain.

In one embodiment, any control channel candidate comprised in the second candidate set occupies time-frequency resources in time-frequency domain.

In one embodiment, any control channel candidate comprised in the first candidate set is a Physical Downlink Control Channel (PDCCH) Candidate.

In one embodiment, any control channel candidate comprised in the first candidate set is a Monitored PDCCH Candidate.

In one embodiment, any control channel candidate comprised in the first candidate set is a Physical Downlink Control Channel (PDCCH) Candidate using a DCI Format.

In one embodiment, any control channel candidate comprised in the first candidate set is a time-frequency resource set that may carry DCI in a specific format.

In one embodiment, when the first candidate set comprises multiple control channel candidates, the first candidate set comprises two control channel candidates occupying same time-frequency resources.

In one embodiment, when the first candidate set comprises multiple control channel candidates, time-frequency resources occupied by any two control channel candidates comprised in the first candidate set are different.

In one embodiment, any control channel candidate comprised in the second candidate set is a Physical Downlink Control Channel (PDCCH) Candidate.

In one embodiment, any control channel candidate comprised in the second candidate set is a Monitored PDCCH Candidate.

In one embodiment, any control channel candidate comprised in the second candidate set is a Physical Downlink Control Channel (PDCCH) Candidate using a DCI Format.

In one embodiment, any control channel candidate comprised in the second candidate set is a time-frequency resource set that may carry DCI in a specific format.

In one embodiment, when the second candidate set comprises multiple control channel candidates, the second candidate set comprises two control channel candidates occupying same time-frequency resources.

In one embodiment, when the second candidate set comprises multiple control channel candidates, time-frequency resources occupied by any two control channel candidates comprised in the second candidate set are different.

In one embodiment, each control channel candidate comprised in the first candidate set belongs to the target cell.

In one embodiment, frequency-domain resources occupied by each control channel candidate comprised in the first candidate set belong to a carrier corresponding to the target cell.

In one embodiment, each control channel candidate comprised in the first candidate set is a control channel candidate on the target cell.

In one embodiment, each control channel candidate comprised in the first candidate set can be used for transmitting a control channel for scheduling the characteristic cell.

In one embodiment, each control channel candidate comprised in the first candidate set can be used for transmitting a control channel for scheduling a signal on the characteristic cell.

In one embodiment, the first candidate set comprises all control channels on the target cell that can be used for transmitting a control channel for scheduling a signal on the characteristic cell.

In one embodiment, there isn't any control channel candidate in the first candidate set that can be used for scheduling a serving cell other than the characteristic cell.

In one embodiment, there is one or more control channel candidates comprised in the second candidate set belonging to a cell other than the target cell.

In one embodiment, any control channel candidate in the second candidate set belongs to either of the target cell and the characteristic cell.

In one embodiment, frequency-domain resources occupied by any control channel candidate in the second candidate set belong to either of a carrier corresponding to the target cell and a carrier corresponding to the characteristic cell.

In one embodiment, any control channel candidate in the second candidate set belongs to the target cell or the characteristic cell.

In one embodiment, the second candidate set comprises a control channel candidate belonging to a serving cell other than the target cell and the characteristic cell.

In one embodiment, each control channel candidate comprised in the second candidate set can be used for transmitting a control channel for scheduling the characteristic cell.

In one embodiment, the second candidate set comprises all control channels that can be used for transmitting a control channel for scheduling the characteristic cell.

In one embodiment, each control channel candidate comprised in the second candidate set can be used for transmitting a control channel for scheduling a signal on the characteristic cell.

In one embodiment, there isn't any control channel candidate in the second candidate set that can be used for scheduling a serving cell other than the characteristic cell.

In one embodiment, time-domain resources occupied by each control channel candidate in the first candidate set belong to the first time window.

In one embodiment, time-domain resources occupied by each control channel candidate in the second candidate set belong to the first time window.

In one embodiment, the phrase that "each control channel candidate comprised in the first candidate set is a control channel candidate used for scheduling the characteristic cell on the target cell" comprises a meaning that the first candidate set comprises each Aggregation Level (AL) control channel candidate used for scheduling the characteristic cell in the target cell.

In one embodiment, the phrase that "each control channel candidate comprised in the first candidate set is a control channel candidate used for scheduling the characteristic cell on the target cell" comprises a meaning that the first candidate set comprises a control channel candidate used for scheduling the characteristic cell in the first time window in the target cell.

In one embodiment, the phrase that "each control channel candidate comprised in the second candidate set is a control channel candidate used for scheduling the characteristic cell" comprises a meaning that the second candidate set comprises each Aggregation Level (AL) control channel candidate for scheduling the characteristic cell in the first time window.

In one embodiment, the phrase that "each control channel candidate comprised in the second candidate set is a control channel candidate used for scheduling the characteristic cell" comprises a meaning that the second candidate set comprises each Aggregation Level (AL) control channel candidate for scheduling the characteristic cell.

In one embodiment, the phrase that "each control channel candidate comprised in the second candidate set is a control channel candidate used for scheduling the characteristic cell" comprises a meaning that the second candidate set consists of control channel candidate(s) comprised in the first candidate set and control channel candidate(s) in the characteristic cell used for scheduling the characteristic cell.

In one embodiment, the phrase that "each control channel candidate comprised in the second candidate set is a control channel candidate used for scheduling the characteristic cell" comprises a meaning that the second candidate set consists of control channel candidate(s) comprised in the first candidate set in the first time window and control channel candidate(s) in the characteristic cell used for scheduling the characteristic cell.

In one embodiment, the fourth number is no less than the third number.

In one embodiment, the third number is a positive integer.

In one embodiment, the fourth number is a positive integer.

In one embodiment, the Non-Overlapped Control Resource Elements refer to Non-Overlapped CCEs.

In one embodiment, two Control Resource Sets being non-overlapped means that two Control Resource Elements respectively belong to different Control Resource Sets, or control channel candidates respectively occupying two Control Resource Elements occupy different starting symbols in time domain.

In one embodiment, the phrase that "the second factor is linear with a ratio of the third number to the fourth number" comprises a meaning that the second factor is negatively linear with a ratio of the third number to the fourth number.

In one embodiment, the phrase that "the second factor is linear with a ratio of the third number to the fourth number" comprises a meaning that the second factor is positively linear with a ratio of the third number to the fourth number.

In one embodiment, the phrase that "the second factor is linear with a ratio of the third number to the fourth number" comprises a meaning that the second factor is equal to 1 being subtracted by a ratio of the third number to the fourth number.

In one embodiment, the phrase that "the second factor is linear with a ratio of the third number to the fourth number" is implemented through the following formula:

$$\vartheta = 1 - \frac{G_3}{G_4}$$

herein, $\vartheta$ represents the second factor, $G_3$ represents the third number, and $G_4$ represents the fourth number.

Embodiment 15

Embodiment 15 illustrates a schematic diagram of a relation between a first parameter and a first subcarrier spacing according to one embodiment of the present application, as shown in FIG. 15. In FIG. 15, the first column on the left represents indexes of subcarrier spacings, the second column on the left represents X candidate parameters, an index of a subcarrier spacing in black is an index of a first subcarrier spacing, and a candidate parameter in bold is a first parameter.

In Embodiment 15, the first subcarrier spacing in the present application is one of X candidate subcarrier spacings, X being a positive integer greater than 1; the X candidate subcarrier spacings respectively correspond to X candidate parameters, each of the X candidate parameters being a positive integer; a first parameter is a candidate parameter corresponding to the first subcarrier spacing among the X candidate parameters, the first threshold in the present application is equal to a target value being rounded down to a nearest integer, the first parameter being used to determine the target value.

In one embodiment, any of the X candidate subcarrier spacings is equal to one of 15 kHz, 30 kHz, 60 kHz, or 120 kHz.

In one embodiment, any of the X candidate subcarrier spacings is equal to one of 15 kHz, 30 kHz, 60 kHz, 120 kHz or 240 kHz.

In one embodiment, any of the X candidate subcarrier spacings is equal to 15 kHz multiplied by a non-negative integral power of 2.

In one embodiment, X is equal to 4.

In one embodiment, X is greater than 4.

In one embodiment, X is no less than 4.

In one embodiment, the X candidate subcarrier spacings are predefined.

In one embodiment, the X candidate subcarrier spacings are fixed.

In one embodiment, the X candidate subcarrier spacings consist of all subcarrier spacings supported by R17.

In one embodiment, the X candidate subcarrier spacings consist of all subcarrier spacings supported by R16.

In one embodiment, any two candidate subcarrier spacings among the X candidate subcarrier spacings are unequal.

In one embodiment, any of the X candidate parameters is a maximum number of PDCCH Candidate monitorings within a slot on a serving cell.

In one embodiment, any two candidate parameters among the X candidate parameters are unequal.

In one embodiment, there are two candidate parameters among the X candidate parameters being equal.

In one embodiment, X is equal to 4, the X candidate parameters respectively being 56, 56, 48 and 32.

In one embodiment, any of the X candidate parameters is a possible value of $$C_{PDCCH}^{max,slot,\mu}$$

In one embodiment, the target value is an integer.

In one embodiment, the target value is a fraction.

In one embodiment, the target value is a rational number.

In one embodiment, the target value is a non-integral rational number.

In one embodiment, the phrase that "the first parameter is used to determine the target value" comprises a meaning that the target value is directly proportional to the first parameter.

In one embodiment, the phrase that "the first parameter is used to determine the target value" comprises the meaning that the first parameter is used by the first node in the present application to determine the target value.

In one embodiment, the phrase that "the first parameter is used to determine the target value" comprises a meaning that the target value is directly proportional to the first parameter, where a scaling coefficient between the target value and the first parameter is related to the target proportional value in the present application.

In one embodiment, the phrase that "the first parameter is used to determine the target value" comprises a meaning that the target value is directly proportional to the first parameter, where a scaling coefficient between the target value and the first parameter is related to the first capability parameter in the present application.

In one embodiment, the phrase that "the first parameter is used to determine the target value" comprises a meaning that the target value is directly proportional to the first parameter, where a scaling coefficient between the target value and the first parameter is equal to a product of the target proportional value and the first capability parameter in the present application.

In one embodiment, the phrase that "the first parameter is used to determine the target value" comprises a meaning that for a given said target proportional value in the present application and a given said first capability parameter in the present application, the target value is linear with the first parameter.

In one embodiment, the phrase that "the first parameter is used to determine the target value" comprises a meaning that the target value is equal to a product of the first parameter, the target proportional value in the present application and the first capability parameter in the present application.

In one embodiment, the phrase that "the first parameter is used to determine the target value" comprises the meaning that the first parameter is used to determine the target value through functional operation.

In one embodiment, the phrase that "the first parameter is used to determine the target value" is implemented by means of the formula as follows:

$$C_{PDCCH}^{total,slot,\mu} = \lfloor N_{cells}^{cap} \cdot C_{PDCCH}^{max,slot,\mu} \cdot P_{cells}^{DL,\mu} \rfloor$$

herein, $$C_{PDCCH}^{total,slot,\mu}$$

denotes the first threshold, $$N_{cells}^{cap} \cdot C_{PDCCH}^{max,slot,\mu} \cdot P_{cells}^{DL,\mu}$$

denotes the target value, $$C_{PDCCH}^{max,slot,\mu}$$

denotes the first parameter, $$P_{cells}^{DL,\mu}$$

denotes the target proportional value in the present application, $$N_{cells}^{cap}$$

denotes the first capability parameter in the present application, and μ denotes an index of the first subcarrier spacing.

In one embodiment, the first node in the present application is not required to ensure that a number of Control Resource Elements comprised in the M Control Resource Elements monitored on any sub-band in the first sub-band set in the first time window exceeds a smaller value of the first threshold and the first parameter.

In one embodiment, for each serving cell comprised in the scheduled cell set in the present application, the first node in the present application is not required to ensure that a number of Control Resource Elements comprised in the M Control Resource Elements monitored on any sub-band in the first sub-band set in the first time window exceeds a smaller value of the first threshold and the first parameter.

In one embodiment, for each serving cell simultaneously belonging to the scheduled cell set in the present application and the first cell subset in the present application, the first node in the present application is not required to ensure that a number of Control Resource Elements comprised in the M Control Resource Elements monitored on any sub-band in the first sub-band set in the first time window exceeds a smaller value of the first threshold and the first parameter.

In one embodiment, the first node in the present application is not required to ensure that a number of Control Resource Elements comprised in the M Control Resource Elements monitored on any sub-band in the first sub-band set in the first time window exceeds a smaller value of the first threshold and a first product, where the first product is equal to a product of the first factor and the first parameter.

In one embodiment, for each serving cell simultaneously belonging to the scheduled cell set in the present application and the second cell subset in the present application, the first node in the present application is not required to ensure that a number of Control Resource Elements comprised in the M Control Resource Elements monitored on any sub-band in the first sub-band set in the first time window exceeds a smaller value of the first threshold and a first product, where the first product is equal to a product of the first factor and the first parameter.

In one embodiment, for each serving cell simultaneously belonging to the scheduled cell set in the present application and the second cell subset in the present application, the first node in the present application is not required to ensure that a number of Control Resource Elements comprised in the M Control Resource Elements monitored on any sub-band in the first sub-band set in the first time window exceeds a smaller value of the first threshold and the first parameter.

In one embodiment, for each serving cell comprised in the scheduled cell set in the present application, to which each scheduling cell corresponds belongs to the first cell subset in the present application, the first node in the present application is not required to ensure that a number of Control Resource Elements comprised in the M Control Resource Elements monitored on any sub-band in the first sub-band set in the first time window exceeds a smaller value of the first threshold and the first parameter.

In one embodiment, for each serving cell comprised in the scheduled cell set in the present application, to which each scheduling cell corresponds belongs to the second cell subset in the present application, the first node in the present application is not required to ensure that a number of Control Resource Elements comprised in the M Control Resource Elements monitored on any sub-band in the first sub-band set in the first time window exceeds a smaller value of the first threshold and a first product, where the first product is equal to a product of the first factor and the first parameter.

In one embodiment, for each serving cell comprised in the scheduled cell set in the present application, to which each scheduling cell corresponds belongs to the second cell subset in the present application, the first node in the present application is not required to ensure that a number of Control Resource Elements comprised in the M Control Resource Elements monitored on any sub-band in the first sub-band set in the first time window exceeds a smaller value of the first threshold and the first parameter.

Embodiment 16

Figure 16:
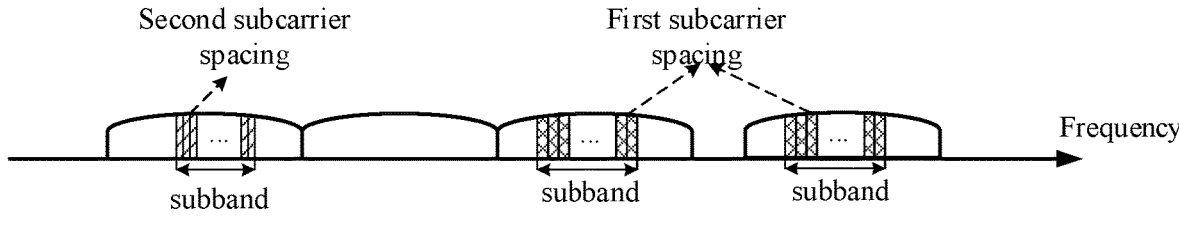
FIG. 16 illustrates a schematic diagram of a relation between a first subcarrier spacing and a second subcarrier spacing according to one embodiment of the present application.

Embodiment 16 illustrates a schematic diagram of a relation between a first subcarrier spacing and a second subcarrier spacing according to one embodiment of the present application, as shown in FIG. 16. In FIG. 16, the horizontal axis represents frequency, each block with an arc top represents a serving cell, each bar filled with oblique lines represents a subcarrier in a characteristic sub-band, and each bar filled with cross-lines represents a subcarrier comprised in one sub-band in a first sub-band set.

In Embodiment 16, the characteristic cell in the present application comprises a characteristic sub-band, the characteristic sub-band comprising a positive integer number of subcarrier(s), a subcarrier spacing of any subcarrier comprised in the characteristic sub-band is equal to a second subcarrier spacing, the first subcarrier spacing being unequal to the second subcarrier spacing in the present application.

In one embodiment, the phrase that "the characteristic cell comprises a characteristic sub-band" means that a carrier corresponding to the characteristic cell comprises the characteristic sub-band.

In one embodiment, the phrase that "the characteristic cell comprises a characteristic sub-band" means that the characteristic sub-band belongs to the characteristic cell.

In one embodiment, the phrase that "the characteristic cell comprises a characteristic sub-band" means that the characteristic sub-band belongs to a carrier corresponding to the characteristic cell.

In one embodiment, the phrase that "the characteristic cell comprises a characteristic sub-band" means that the characteristic sub-band is used for the characteristic cell.

In one embodiment, the characteristic sub-band is an Active BWP of the characteristic cell.

In one embodiment, the characteristic sub-band is an Inactive BWP of the characteristic cell.

In one embodiment, the characteristic sub-band is an Initial BWP of the characteristic cell.

In one embodiment, the characteristic sub-band is a Default BWP of the characteristic cell.

In one embodiment, the characteristic sub-band comprises multiple subcarriers.

In one embodiment, the characteristic sub-band comprises a positive integral multiple of 12 subcarriers.

In one embodiment, the characteristic sub-band comprises multiple subcarriers, any two subcarriers comprised in the characteristic sub-band have equal Subcarrier Spacings (SCS).

In one embodiment, the second subcarrier spacing is equal to 15 kHz multiplied by a non-negative integral power of 2.

In one embodiment, the second subcarrier spacing is equal to one of 15 kHz, 30 kHz, 60 kHz, or 120 kHz.

In one embodiment, the second subcarrier spacing is larger than the first subcarrier spacing.

In one embodiment, the second subcarrier spacing is smaller than the first subcarrier spacing.

Embodiment 17

Figure 17:
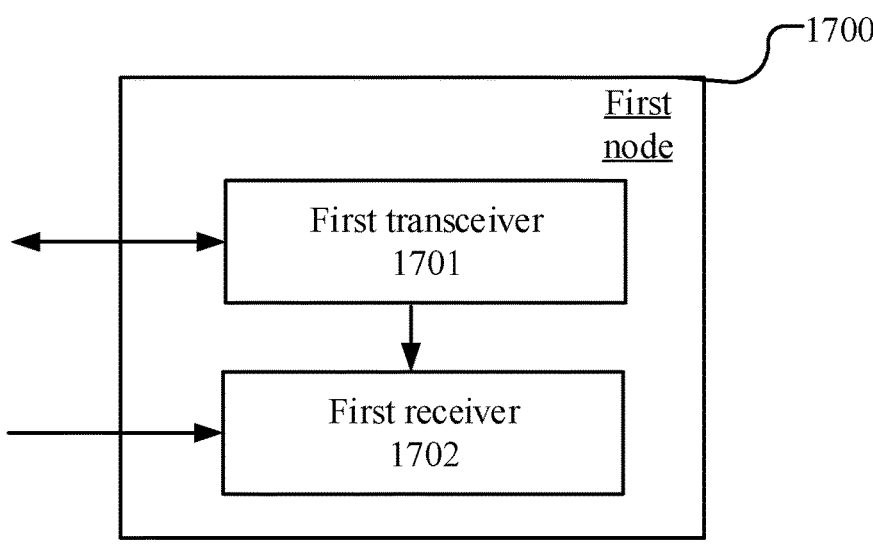
FIG. 17 illustrates a structure block diagram of a processing device in a first node according to one embodiment of the present application.

Embodiment 17 illustrates a structure block diagram of a processing device in a first node in one embodiment, as shown in FIG. 17. In FIG. 17, a processing device 1700 in the first node is comprised of a first transceiver 1701 and a first receiver 1702. The first transceiver 1701 comprises the transmitter/receiver 456 (comprising the antenna 460), the transmitting processor 455, the receiving processor 452 and the controller/processor 490 in FIG. 4 of the present application; the first receiver 1702 comprises the transmitter/receiver 456 (comprising the antenna 460), the receiving processor 452 and the controller/processor 490 in FIG. 4 of the present application.

In Embodiment 17, the first transceiver 1701 receives first information, the first information being used to determine a target cell, the target cell being used to schedule a characteristic cell; the first receiver 1702 monitors M Control Resource Elements in a first time window, M being a positive integer greater than 1, any one of the M Control Resource Elements being occupied by a control channel candidate; herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

In one embodiment, a first Control Resource Element is one of the M Control Resource Elements, and a second Control Resource Element is one of the M Control Resource Elements other than the first Control Resource Element; the first Control Resource Element and the second Control Resource Element respectively belong to different Control Resource Sets, or control channel candidates respectively occupying the first Control Resource Element and the second Control Resource Element occupy different starting symbols in time domain.

In one embodiment, the first transceiver 1701 receives second information; herein, the second information is used to determine a configured cell group, the configured cell group comprising multiple serving cells; the target cell belongs to the configured cell group, and the characteristic cell belongs to the configured cell group, with the characteristic cell being a primary cell in the configured cell group; a scheduled cell set comprises serving cell(s) scheduled by the serving cell(s) comprised in the scheduling cell set, the scheduled cell set comprising a positive integer number of serving cell(s); any serving cell comprised in the scheduling cell set belongs to the configured cell group, while any serving cell comprised in the scheduled cell set belongs to the configured cell group.

In one embodiment, a target proportional value is used to determine the first threshold, the target proportional value being a positive number no greater than 1; the target proportional value is equal to either a first proportional value or a second proportional value; the first proportional value is equal to a ratio of a first sum value to a first characteristic sum value, while the second proportional value is equal to a ratio of a second sum value to a second characteristic sum value; the first sum value is a positive number, the first characteristic sum value is a positive number no less than the first sum value, while the second sum value is a positive number, the second characteristic sum value is a positive number no less than the second sum value, where the first proportional value and the second proportional value are unequal; at least one of whether the scheduling cell set comprises the target cell or whether the characteristic cell and the target cell are the same is used to determine the target proportional value between the first proportional value and the second proportional value.

In one embodiment, the first transceiver 1701 receives third information; herein, the third information is used to determine a first cell subset and a second cell subset, the first cell subset comprising a positive integer number of serving cell(s), and the second cell subset comprising a positive integer number of serving cell(s); a number of serving cell(s) belonging to the first cell subset comprised in the scheduled cell set in the present application is equal to a first number, while a number of serving cell(s) belonging to the second cell subset comprised in the scheduled cell set in the present application is equal to a second number; the first characteristic sum value in the present application is linear with a product of a number of serving cell(s) comprised in the second cell subset and a first factor, and the first characteristic sum value in the present application is linear with a number of serving cell(s) comprised in the first cell subset; the first sum value in the present application is linear with a product of the second number and the first factor, and the first sum value in the present application is linear with the first number; the first factor is configurable, or the first factor is pre-defined.

In one embodiment, the second sum value in the present application and the first sum value in the present application are equal, while the first characteristic sum value in the present application and the second characteristic sum value in the present application are unequal; a difference between the second characteristic sum value and the first characteristic sum value in the present application is pre-defined, or a difference between the second characteristic sum value and the first characteristic sum value in the present application is configurable.

In one embodiment, the first transceiver 1701 receives fourth information; herein, the fourth information is used to determine a second factor, the second factor being a positive number less than 1, the second factor is used to determine the second sum value in the present application, the second sum value in the present application being unequal to the first sum value in the present application, the second characteristic sum value in the present application being equal to the first characteristic sum value in the present application.

In one embodiment, the fourth information is used to determine a first candidate set and a second candidate set, the first candidate set comprising a positive integer number of control channel candidate(s), the second candidate set comprising a positive integer number of control channel candidate(s); each control channel candidate comprised in the first candidate set is a control channel candidate used for scheduling the characteristic cell of the present application on the target cell in the present application, while each control channel candidate comprised in the second candidate set is a control channel candidate used for scheduling the characteristic cell of the present application; a number of non-overlapped control resource elements occupied by control channel candidate(s) comprised in the first candidate set is equal to a third number, while a number of non-overlapped control resource elements occupied by control channel candidate(s) comprised in the second candidate set is equal to a fourth number; the second factor in the present application is linear with a ratio of the third number to the fourth number.

In one embodiment, the first subcarrier spacing is one of X candidate subcarrier spacings, X being a positive integer greater than 1; the X candidate subcarrier spacings respectively correspond to X candidate parameters, each of the X candidate parameters being a positive integer; a first parameter is a candidate parameter corresponding to the first subcarrier spacing among the X candidate parameters, the first threshold is equal to a target value being rounded down to a nearest integer, the first parameter being used to determine the target value.

In one embodiment, the characteristic cell comprises a characteristic sub-band, the characteristic sub-band comprising a positive integer number of subcarrier(s), a subcarrier spacing of any subcarrier comprised in the characteristic sub-band is equal to a second subcarrier spacing, the first subcarrier spacing being unequal to the second subcarrier spacing.

In one embodiment, the first transceiver 1701 transmits fifth information; herein, the fifth information is used to indicate a first capability parameter, the first capability parameter being a positive integer; the first capability parameter is used to determine the first threshold.

Embodiment 18

Figure 18:
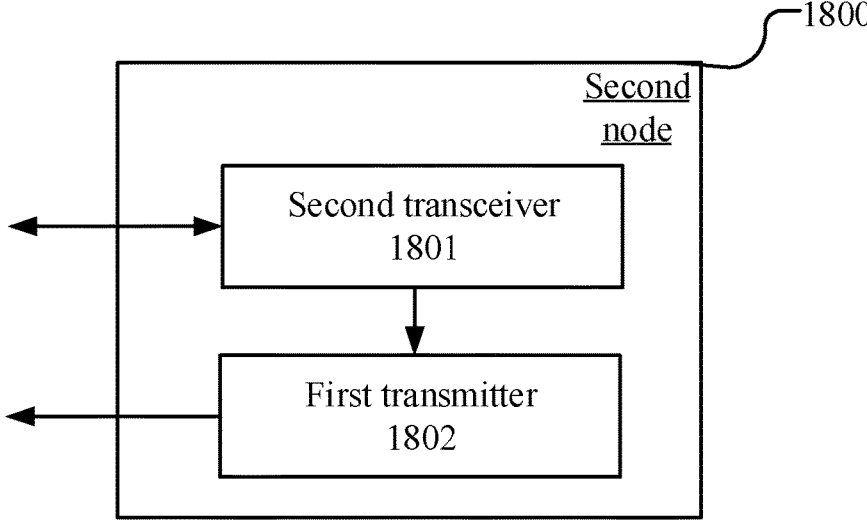
FIG. 18 illustrates a structure block diagram a processing device in a second node according to one embodiment of the present application.

Embodiment 18 illustrates a structure block diagram of a processing device in a second node in one embodiment, as shown in FIG. 18. In FIG. 18, a processing device 1800 in the second node is comprised of a second transceiver 1801 and a first transmitter 1802. The second transceiver 1801 comprises the transmitter/receiver 416 (comprising the antenna 460), the receiving processor 412, the transmitting processor 415 and the controller/processor 440 in FIG. 4 of the present application; the first transmitter 1802 comprises the transmitter/receiver 416 (comprising the antenna 460), the transmitting processor 415 and the controller/processor 440 in FIG. 4 of the present application.

In Embodiment 18, the second transceiver 1801 transmits first information, the first information being used to determine a target cell, the target cell being used to schedule a characteristic cell; the first transmitter 1802 determines M Control Resource Elements in a first time window, M being a positive integer greater than 1, any one of the M Control Resource Elements being occupied by a control channel candidate; herein, a sub-band to which any Control Resource Element of the M Control Resource Elements belongs in frequency domain belongs to a first sub-band set, the first sub-band set comprising a positive integer number of sub-band(s); a scheduling cell set comprises a positive integer number of serving cell(s), a serving cell to which any sub-band comprised in the first sub-band set belongs to the scheduling cell set; a subcarrier spacing of a subcarrier comprised in any sub-band comprised in the first sub-band set is equal to a first subcarrier spacing; the first subcarrier spacing is used to determine a time length of the first time window; M is no greater than a first threshold, at least one of whether the scheduling cell set comprises the target cell or whether the characteristic cell and the target cell are the same is used to determine the first threshold, the first threshold being a non-negative integer.

In one embodiment, a first Control Resource Element is one of the M Control Resource Elements, and a second Control Resource Element is one of the M Control Resource Elements other than the first Control Resource Element; the first Control Resource Element and the second Control Resource Element respectively belong to different Control Resource Sets, or control channel candidates respectively occupying the first Control Resource Element and the second Control Resource Element occupy different starting symbols in time domain.

In one embodiment, the second transceiver 1801 transmits second information; herein, the second information is used to indicate a configured cell group, the configured cell group comprising multiple serving cells; the target cell belongs to the configured cell group, and the characteristic cell belongs to the configured cell group, with the characteristic cell being a primary cell in the configured cell group; a scheduled cell set comprises serving cell(s) scheduled by the serving cell(s) comprised in the scheduling cell set, the scheduled cell set comprising a positive integer number of serving cell(s); any serving cell comprised in the scheduling cell set belongs to the configured cell group, while any serving cell comprised in the scheduled cell set belongs to the configured cell group.

In one embodiment, a target proportional value is used to determine the first threshold, the target proportional value being a positive number no greater than 1; the target proportional value is equal to either a first proportional value or a second proportional value; the first proportional value is equal to a ratio of a first sum value to a first characteristic sum value, while the second proportional value is equal to a ratio of a second sum value to a second characteristic sum value; the first sum value is a positive number, the first characteristic sum value is a positive number no less than the first sum value, while the second sum value is a positive number, the second characteristic sum value is a positive number no less than the second sum value, where the first proportional value and the second proportional value are unequal; at least one of whether the scheduling cell set comprises the target cell or whether the characteristic cell and the target cell are the same is used to determine the target proportional value between the first proportional value and the second proportional value.

In one embodiment, the second transceiver 1801 transmits third information; herein, the third information is used to indicate a first cell subset and a second cell subset, the first cell subset comprising a positive integer number of serving cell(s), and the second cell subset comprising a positive integer number of serving cell(s); a number of serving cell(s) belonging to the first cell subset comprised in the scheduled cell set in the present application is equal to a first number, while a number of serving cell(s) belonging to the second cell subset comprised in the scheduled cell set in the present application is equal to a second number; the first characteristic sum value in the present application is linear with a product of a number of serving cell(s) comprised in the second cell subset and a first factor, and the first characteristic sum value in the present application is linear with a number of serving cell(s) comprised in the first cell subset; the first sum value in the present application is linear with a product of the second number and the first factor, and the first sum value in the present application is linear with the first number; the first factor is configurable, or the first factor is pre-defined.

In one embodiment, the second sum value in the present application and the first sum value in the present application are equal, while the first characteristic sum value in the present application and the second characteristic sum value in the present application are unequal; a difference between the second characteristic sum value and the first characteristic sum value in the present application is pre-defined, or a difference between the second characteristic sum value and the first characteristic sum value in the present application is configurable.

In one embodiment, the second transceiver 1801 transmits fourth information; herein, the fourth information is used to indicate a second factor, the second factor being a positive number less than 1, the second factor is used to determine the second sum value in the present application, the second sum value in the present application being unequal to the first sum value in the present application, the second characteristic sum value in the present application being equal to the first characteristic sum value in the present application.

In one embodiment, the fourth information is used to indicate a first candidate set and a second candidate set, the first candidate set comprising a positive integer number of control channel candidate(s), the second candidate set comprising a positive integer number of control channel candidate(s); each control channel candidate comprised in the first candidate set is a control channel candidate used for scheduling the characteristic cell of the present application on the target cell in the present application, while each control channel candidate comprised in the second candidate set is a control channel candidate used for scheduling the characteristic cell of the present application; a number of non-overlapped control resource elements occupied by control channel candidate(s) comprised in the first candidate set is equal to a third number, while a number of non-overlapped control resource elements occupied by control channel candidate(s) comprised in the second candidate set is equal to a fourth number; the second factor in the present application is linear with a ratio of the third number to the fourth number.

In one embodiment, the first subcarrier spacing is one of X candidate subcarrier spacings, X being a positive integer greater than 1; the X candidate subcarrier spacings respectively correspond to X candidate parameters, each of the X candidate parameters being a positive integer; a first parameter is a candidate parameter corresponding to the first subcarrier spacing among the X candidate parameters, the first threshold is equal to a target value being rounded down to a nearest integer, the first parameter being used to determine the target value.

In one embodiment, the characteristic cell comprises a characteristic sub-band, the characteristic sub-band comprising a positive integer number of subcarrier(s), a subcarrier spacing of any subcarrier comprised in the characteristic sub-band is equal to a second subcarrier spacing, the first subcarrier spacing being unequal to the second subcarrier spacing.

In one embodiment, the second transceiver 1801 receives fifth information; herein, the fifth information is used to determine a first capability parameter, the first capability parameter being a positive integer; the first capability parameter is used to determine the first threshold.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node or the second node, or UE or terminal includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network equipment in the present application includes but is not limited to macro-cellular base stations, micro-cellular base stations, home base stations, relay base station, eNB, gNB, Transmitter Receiver Point (TRP), relay satellite, satellite base station, airborne base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A method performed by a user equipment (UE), the method comprising:

receiving radio resource control (RRC) signaling indicating a target cell, wherein the target cell is used to schedule a primary cell (PCell);

determining whether a scheduling cell set includes the target cell;

determining whether the target cell is the same as the PCell; and monitoring a plurality of non-overlapped control channel elements (CCEs) on an active downlink (DL) bandwidth part (BWP) of a serving cell within a slot, wherein each monitored CCE is included in at least one physical downlink control channel (PDCCH) candidate;

wherein subcarriers of a first sub-band set have a first subcarrier spacing (SCS), and the first SCS determines a duration of the slot; and wherein a number of the monitored non-overlapped CCEs is less than or equal to a threshold, the threshold being determined based on at least one of: (i) whether the scheduling cell set includes the target cell, or (ii) whether the target cell is the PCell.

2. The method of claim 1, wherein the number of the monitored non-overlapped CCEs is an integer greater than 1.

3. The method of claim 1, wherein the RRC signaling includes a CrossCarrierSchedulingConfig information element.

4. The method of claim 1, further comprising:

receiving RRC signaling that configures a cell group including a plurality of serving cells, wherein the target cell and the PCell belong to the cell group, and wherein a scheduling cell set and a scheduled cell set are subsets of the cell group.

5. The method of claim 1, wherein two of the monitored CCEs belong to different control resource sets (CORESETs), or the PDCCH candidate that include those CCEs start in different orthogonal frequency division multiplexing (OFDM) symbols in the slot.

6. The method of claim 1, wherein the first sub-band set corresponds to frequency-domain monitoring locations configured for a search space set on the serving cell.

7. The method of claim 1, wherein the threshold is determined by applying a target proportional value to a characteristic sum value and rounding the sum value down to the nearest integer.

8. The method of claim 7, wherein the target proportional value is selected from a first proportional value and a second proportional value, wherein the first proportional value is different than the second proportional value.

9. The method of claim 1, wherein the first SCS is selected from a set of candidate SCS values, each candidate SCS corresponding to a parameter, and the threshold is determined from a target value derived from the parameter, the target value being rounded down to an integer.

10. The method of claim 1, wherein monitoring the PDCCH candidates is performed by blind decoding the candidates that occupy the monitored CCEs.

11. A user equipment (UE), comprising:

a transceiver; and a processor;

wherein the transceiver and the processor are configured to:

receive radio resource control (RRC) signaling indicating a target cell, wherein the target cell is used to schedule a primary cell (PCell);

determine whether a scheduling cell set includes the target cell;

determine whether the target cell is the same as the PCell; and monitor a plurality of non-overlapped control channel elements (CCEs) on an active downlink (DL) bandwidth part (BWP) of a serving cell within a slot, wherein each monitored CCE is included in at least one physical downlink control channel (PDCCH) candidate;

wherein subcarriers of a first sub-band set have a first subcarrier spacing (SCS), and the first SCS determines a duration of the slot; and wherein a number of the monitored non-overlapped CCEs is less than or equal to a threshold, the threshold being determined based on at least one of: (i) whether the scheduling cell set includes the target cell, or (ii) whether the target cell is the PCell.

12. The UE of claim 11, wherein the number of the monitored non-overlapped CCEs is an integer greater than 1.

13. The UE of claim 11, wherein the RRC signaling includes a CrossCarrierSchedulingConfig information element.

14. The UE of claim 11, wherein the transceiver and the processor are further configured to:

receive RRC signaling that configures a cell group including a plurality of serving cells, wherein the target cell and the PCell belong to the cell group, and wherein a scheduling cell set and a scheduled cell set are subsets of the cell group.

15. The UE of claim 11, wherein two of the monitored CCEs belong to different control resource sets (CORESETs), or the PDCCH candidate that include those CCEs start in different orthogonal frequency division multiplexing (OFDM) symbols in the slot.

16. The UE of claim 11, wherein the first sub-band set corresponds to frequency-domain monitoring locations configured for a search space set on the serving cell.

17. The UE of claim 11, wherein the threshold is determined by applying a target proportional value to a characteristic sum value and rounding the sum value down to the nearest integer.

18. The UE of claim 17, wherein the target proportional value is selected from a first proportional value and a second proportional value, wherein the first proportional value is different than the second proportional value.

19. The UE of claim 11, wherein the first SCS is selected from a set of candidate SCS values, each candidate SCS corresponding to a parameter, and the threshold is determined from a target value derived from the parameter, the target value being rounded down to an integer.

20. The UE of claim 11, wherein the monitoring of the PDCCH candidates is performed by blind decoding the candidates that occupy the monitored CCEs.

\* \* \* \* \*